(12) United States Patent
Wenzel et al.

(10) Patent No.: US 11,209,184 B2
(45) Date of Patent: Dec. 28, 2021

(54) CONTROL SYSTEM FOR CENTRAL ENERGY FACILITY WITH DISTRIBUTED ENERGY STORAGE

(71) Applicant: Johnson Controls Technology Company, Auburn Hills, MI (US)

(72) Inventors: Michael J. Wenzel, Grafton, WI (US); Mohammad N. Elbsat, Milwaukee, WI (US); Matthew J. Ellis, Milwaukee, WI (US); Matthew J. Asmus, Watertown, WI (US); Andrew J. Przybylski, Franksville, WI (US); Ryan A. Baumgartner, Milwaukee, WI (US); John H. Burroughs, Wauwatosa, WI (US); Kirk H. Drees, Cedarburg, WI (US); Robert D. Turney, Watertown, WI (US); Graeme Willmott, West Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 28 days.

(21) Appl. No.: 16/246,454

(22) Filed: Jan. 11, 2019

(65) Prior Publication Data
US 2019/0219293 A1 Jul. 18, 2019

Related U.S. Application Data

(60) Provisional application No. 62/616,917, filed on Jan. 12, 2018.

(51) Int. Cl.
*F24F 11/47* (2018.01)
*G05B 19/418* (2006.01)
(Continued)

(52) U.S. Cl.
CPC ............ *F24F 11/47* (2018.01); *G05B 13/048* (2013.01); *G05B 19/418* (2013.01); *G06Q 10/04* (2013.01);
(Continued)

(58) Field of Classification Search
CPC ..... F24F 11/47; G05B 13/048; G05B 19/418; G05B 2219/32021; G06Q 10/04; G06Q 30/0283; G06Q 50/06
See application file for complete search history.

(56) References Cited

U.S. PATENT DOCUMENTS

| 7,580,775 B2 | 8/2009 | Kulyk et al. |
| 7,894,946 B2 | 2/2011 | Kulyk et al. |

(Continued)

*Primary Examiner* — Chad G Erdman
(74) *Attorney, Agent, or Firm* — Foley & Lardner LLP

(57) ABSTRACT

A control system for a central energy facility with distributed energy storage includes a high level coordinator, a low level airside controller, a central plant controller, and a battery controller. The high level coordinator is configured to perform a high level optimization to generate an airside load profile for an airside system, a subplant load profile for a central plant, and a battery power profile for a battery. The low level airside controller is configured to use the airside load profile to operate airside HVAC equipment of the airside subsystem. The central plant controller is configured to use the subplant load profile to operate central plant equipment of the central plant. The battery controller is configured to use the battery power profile to control an amount of electric energy stored in the battery or discharged from the battery at each of a plurality of time steps in an optimization period.

22 Claims, 11 Drawing Sheets

(51) Int. Cl.
  *G05B 13/04* (2006.01)
  *G06Q 50/06* (2012.01)
  *G06Q 30/02* (2012.01)
  *G06Q 10/04* (2012.01)
(52) U.S. Cl.
  CPC ......... *G06Q 30/0283* (2013.01); *G06Q 50/06* (2013.01); *G05B 2219/32021* (2013.01)

(56) References Cited

U.S. PATENT DOCUMENTS

| | | |
|---|---|---|
| 8,527,108 B2 | 9/2013 | Kulyk et al. |
| 8,527,109 B2 | 9/2013 | Kulyk et al. |
| 8,918,223 B2 | 12/2014 | Kulyk et al. |
| 9,110,647 B2 | 8/2015 | Kulyk et al. |
| 9,235,657 B1 | 1/2016 | Wenzel et al. |
| 9,429,923 B2 | 8/2016 | Ward et al. |
| 9,703,339 B2 | 7/2017 | Kulyk et al. |
| 10,139,877 B2 | 11/2018 | Kulyk et al. |
| 10,175,681 B2 | 1/2019 | Wenzel et al. |
| 10,190,793 B2 | 1/2019 | Drees et al. |
| 10,222,083 B2 | 3/2019 | Drees et al. |
| 2009/0112369 A1* | 4/2009 | Gwerder .................. F24F 7/00 700/277 |
| 2011/0066258 A1* | 3/2011 | Torzhkov ............ G05B 13/042 700/29 |
| 2012/0010758 A1* | 1/2012 | Francino ................ G05B 17/02 700/291 |
| 2013/0274940 A1* | 10/2013 | Wei ........................ G06Q 50/06 700/291 |
| 2014/0070617 A1* | 3/2014 | Detmers .................... H02J 3/00 307/64 |
| 2014/0277760 A1* | 9/2014 | Marik ..................... F24F 11/00 700/276 |
| 2015/0316907 A1 | 11/2015 | Elbsat et al. |
| 2016/0313751 A1* | 10/2016 | Risbeck ................. G05B 15/02 |
| 2017/0103483 A1 | 4/2017 | Drees et al. |
| 2017/0104345 A1 | 4/2017 | Wenzel et al. |
| 2018/0004171 A1 | 1/2018 | Patel et al. |
| 2018/0004172 A1 | 1/2018 | Patel et al. |
| 2018/0224814 A1 | 8/2018 | Elbsat et al. |
| 2018/0285800 A1 | 10/2018 | Wenzel et al. |
| 2020/0059098 A1* | 2/2020 | Dong .................... G06Q 50/06 |

\* cited by examiner

CONTROL SYSTEM FOR CENTRAL ENERGY FACILITY WITH DISTRIBUTED ENERGY STORAGE

CROSS-REFERENCE TO RELATED PATENT APPLICATION

This application claims the benefit of and priority to U.S. Provisional Patent Application No. 62/616,917 filed Jan. 12, 2018, the entire disclosure of which is incorporated by reference herein.

BACKGROUND

The present disclosure relates generally to a control system for a central energy facility and more particularly to a control system that coordinates the use of airside equipment, waterside equipment, and battery assets.

On large campuses, energy facilities are used to serve the heating and cooling needs of all the buildings, while utilizing cost savings strategies to manage operational cost. Strategies range from shifting loads to participating in utility programs that offer payouts. Among available strategies are central plant optimization, electrical energy storage, participation in utility demand response programs, and manipulating the temperature setpoints in the campus buildings. However, simultaneously optimizing all of the central plant assets, temperature setpoints and participation in utility programs can be a daunting task even for a powerful computer if the desire is real-time control. These strategies may be implemented separately across several optimization systems without a coordinating algorithm. Due to system interactions, decentralized control may be far from optimal and worse yet may try to use the same asset for different goals.

SUMMARY

One implementation of the present disclosure is a control system for a central energy facility with distributed energy storage. The control system includes a high level coordinator, a low level airside controller, a central plant controller, and a battery controller. The high level coordinator is configured to perform a high level optimization to generate an airside load profile including a load for an airside system, a subplant load profile including a load for each subplant of a central plant, and a battery power profile including a power setpoint for the battery at each of a plurality of time steps in an optimization period. The low level airside controller is configured to use the airside load profile to operate airside HVAC equipment of the airside subsystem. The central plant controller is configured to use the subplant load profile to operate central plant equipment of the central plant. The battery controller is configured to use the battery power profile to control an amount of electric energy stored in a battery or discharged from the battery at each of the plurality of time steps.

In some embodiments, the high level coordinator is configured to perform the high level optimization by optimizing an objective function which accounts for a total cost of energy consumed by the airside HVAC equipment and the central plant equipment and revenue generated by operating the battery to participate in an incentive-based demand response program.

In some embodiments, the high level coordinator is configured to detect whether the airside HVAC equipment, the central plant equipment, and the battery are present. The high level coordinator can be configured to automatically adjust the high level optimization to omit generating the subplant load profile in response to a determination that the central plant equipment are not present, automatically adjust the high level optimization to omit generating the airside load profile in response to a determination that the airside HVAC equipment are not present and automatically adjust the high level optimization to omit generating the battery power profile in response to a determination that the battery is not present.

Another implementation of the present disclosure is a heating, ventilation, or air conditioning (HVAC) system for a building. The HVAC system includes an airside system, a central plant, a battery, and a high level coordinator. The airside system includes airside HVAC equipment configured to provide heating or cooling to a building zone. The central plant includes central plant equipment configured to produce thermal energy used by the airside system to provide the heating or cooling. The battery is configured to store electrical energy and discharge the stored electrical energy for use in powering at least one of the building, the airside HVAC equipment, or the central plant equipment. The high level coordinator is configured to perform a high level optimization to generate an airside load profile including a load for the airside system, a subplant load profile including a load for each subplant of the central plant, and a battery power profile including a power setpoint for the battery at each of a plurality of time steps in an optimization period.

In some embodiments, the high level coordinator is configured to automatically adjust the high level optimization to omit generating the subplant load profile in response to a determination that the central plant is not detected, automatically adjust the high level optimization to omit generating the airside load profile in response to a determination that the airside system is not detected, and automatically adjust the high level optimization to omit generating the battery power profile in response to a determination that the battery is not detected.

In some embodiments, the HVAC system includes a low level airside controller configured to use the airside load profile to operate the airside HVAC equipment of the airside subsystem.

In some embodiments, the airside system includes a plurality of airside subsystems. Each airside subsystem may include airside HVAC equipment configured to provide heating or cooling to a corresponding building zone. The high level coordinator may be configured to generate an airside load profile for each of the plurality of airside subsystems.

In some embodiments, the HVAC system includes a plurality of low level airside controllers. Each low level airside controller may correspond to one of the airside subsystems and may be configured to use the airside subsystem load profile for the corresponding airside subsystem to operate the airside HVAC equipment of the corresponding airside subsystem or generate setpoints that are used to operate the airside HVAC equipment of the corresponding airside subsystem.

In some embodiments, the airside load profile indicates a thermal energy allocation to the airside system at each of the plurality of time steps. In some embodiments, the high level coordinator is configured to use an airside power consumption model to define the airside power consumption of the airside system as a function of the thermal energy allocation to the airside system.

In some embodiments, the high level coordinator is configured to generate an airside temperature model for the airside system, the airside temperature model defining a relationship between the airside system load profile and a temperature of the building zone.

In some embodiments, the HVAC system includes a central plant controller configured to perform a low level optimization to generate setpoints for the central plant equipment subject to a constraint based on the subplant load profile and use the setpoints for the central plant equipment to operate the central plant equipment.

In some embodiments, the high level coordinator is configured to perform the high level optimization by optimizing an objective function which accounts for a total cost of energy consumed by the airside HVAC equipment and the central plant equipment. In some embodiments, the objective functions further accounts for revenue generated by operating the battery to participate in an incentive-based demand response program.

Another implementation of the present disclosure is a method for operating a heating, ventilation, or air conditioning (HVAC) system for a building. The method includes operating an airside system including airside HVAC equipment to provide heating or cooling to a building zone. The method includes operating a central plant including central plant equipment to produce thermal energy used by the airside system to provide the heating or cooling. The method includes performing a high level optimization to generate an airside load profile including a load for the airside system and a subplant load profile including a load for each subplant of the central plant at each of a plurality of time steps in an optimization period.

In some embodiments, the method includes operating a battery to store electrical energy and discharge the stored electrical energy for use in powering at least one of the building, the airside HVAC equipment, or the central plant equipment. Performing the high level optimization may include generating a battery power profile comprising a power setpoint for the battery at each of a plurality of time steps in an optimization period.

In some embodiments, the method includes automatically adjust the high level optimization to omit generating the subplant load profile in response to a determination that the central plant is not detected, automatically adjust the high level optimization to omit generating the airside load profile in response to a determination that the airside system is not detected, and automatically adjust the high level optimization to omit generating the battery power profile in response to a determination that the battery is not detected.

In some embodiments, the method includes using the airside load profile to operate the airside HVAC equipment of the airside subsystem.

In some embodiments, the airside system includes a plurality of airside subsystems. Each airside subsystem may include airside HVAC equipment configured to provide heating or cooling to a different building zone. In some embodiments, the method includes generating an airside load profile for each of the plurality of airside subsystems.

In some embodiments, the method includes operating a plurality of low level airside controllers. Each low level airside controller may correspond to one of the airside subsystems and may operate the airside HVAC equipment of the corresponding airside subsystem. Each of the low level airside controllers may use the airside subsystem load profile for the corresponding airside subsystem.

In some embodiments, the airside load profile indicates a thermal energy allocation to the airside system at each of the plurality of time steps. In some embodiments, the method includes using an airside power consumption model to define the airside power consumption of the airside system as a function of the thermal energy allocation to the airside system.

In some embodiments, the method includes generating an airside temperature model for the airside system. The airside temperature model may define a relationship between the airside system load profile and a temperature of the building zone.

In some embodiments, the method includes performing a low level optimization to generate setpoints for the central plant equipment subject to a constraint based on the subplant load profile and using the setpoints for the central plant equipment to operate the central plant equipment.

In some embodiments, performing the high level optimization includes optimizing an objective function which accounts for a total cost of energy consumed by the airside HVAC equipment and the central plant equipment. In some embodiments, the objective functions further accounts for revenue generated by operating the battery to participate in an incentive-based demand response program.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Central Energy Facility Control System

Figure 1A:
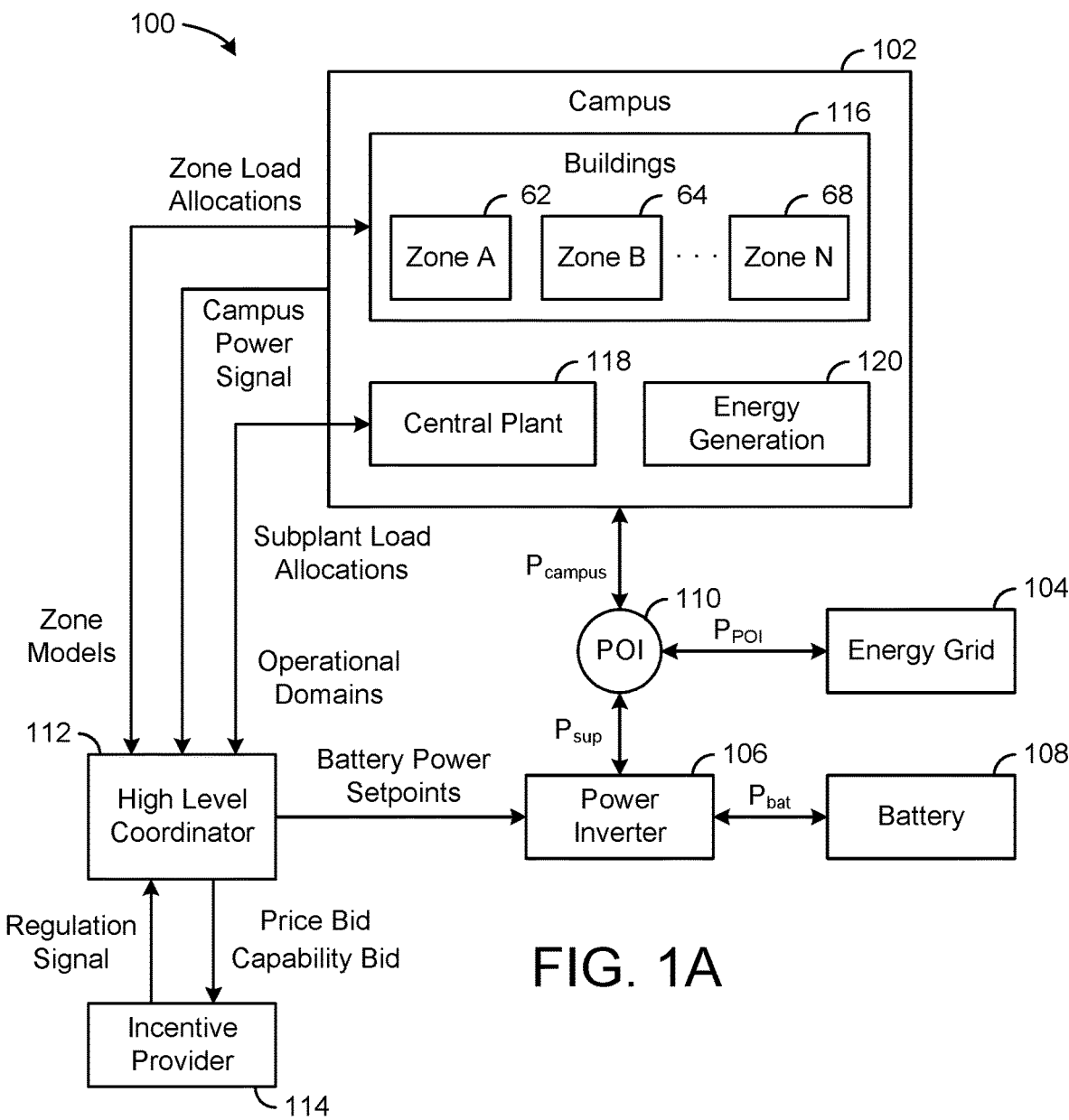
FIG. 1A is a block diagram of a control system for a central energy facility with distributed energy storage, according to an exemplary embodiment.

Referring now to FIG. 1A, a control system 100 for a central energy facility with distributed energy storage is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment. Each of buildings 116 may include one or more zones 62, 64, and 68, which may include floors, spaces, areas, or other locations within buildings 116. Each of zones 62-68 can be controlled separately, as described in greater detail below.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1A, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1A, system 100 is shown to include a high level coordinator 112. High level coordinator 112 can be configured to coordinate the operations of the equipment with buildings 116, the equipment of central plant 118, and the operation of power inverter 106 and battery 108. In some embodiments, high level coordinator 112 is part of a hierarchical optimization system (i.e., control system 100) that operates to coordinate the optimization of central plant 118, battery 108, participation in demand response programs, and temperature setpoints. High level coordinator 112 can determine the load allocations across campus 102 (i.e., the load allocation for each of buildings 116 or each of zones 62-68). High level coordinator 112 can also determine the participation in utility incentive programs such as reservation programs and price adjustment programs. The second tier of control system 100 (shown in FIG. 6A) can be split into three portions: control of central plant 118, control of battery 108, and control of the temperature setpoints for buildings 116 or zones 62-68. The second tier is responsible for converting load allocations into central plant temperature setpoints and flows, battery charge and discharge setpoints, and temperature setpoints, which are delivered to a building management system for execution.

The operation of system 100 can be coordinated by representing the second tier controllers with a smaller set of data that can be used by high level coordinator 112. For central plant optimization, high level coordinator 112 may provide central plant 118 (i.e., a central plant controller within central plant 118) with subplant load allocations that define the loadings for each resource a group of equipment in central plant 118 produces or consumes. The central plant controller may send back an operational domain for each subplant within central plant 118 which constrains how that subplant can operate. For battery storage, high level coordinator 112 may use a simple integrator model of battery 108 and is responsible for providing a demand target and the amount of participation in any incentive programs. These can be provided to battery 108 or power inverter 106 in the form of battery power setpoints. Finally, high level coordinator 112 can perform temperature setpoint optimization for buildings 116 or zones 62-28 by sending load allocations for each of zones 62-68 to one or more low level airside controllers within buildings 116. The low level airside controllers may provide a dynamic model of the zone groups (i.e., a zone model) which can be used by high level coordinator 112. The hierarchal control strategy is successful at optimizing the entire energy facility fast enough to allow the algorithms to control the energy facility, building setpoints, and program bids in real-time.

High level coordinator 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from high level coordinator 112. Conversely, power inverter 106 may be configured to draw power from battery 108 and provide the power to POI 110 in response to receiving a positive power setpoint from high level coordinator 112. The magnitude of the power setpoint may define the amount of power $P_{sup}$ provided to or from power inverter 106. High level coordinator 112 may be configured to generate and provide power setpoints that optimize the value of operating system 100 over a time horizon.

In some embodiments, high level coordinator 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. High level coordinator 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, high level coordinator 112 uses power inverter 106 and battery 108 to perform load shifting for campus 102. For example, high level coordinator 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

High level coordinator 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by high level coordinator 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide high level coordinator 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by high level coordinator 112. In other embodiments, $CP_{cap}$, $CP_{perf}$, and $Reg_{award}$ may not be the same as the bids placed by high level coordinator 112. For example, $CP_{cap}$, $CP_{perf}$, and $Reg_{award}$ may be generated by incentive provider 114 based on bids received from multiple participants in the frequency response program. High level coordinator 112 may use $CP_{cap}$, $CP_{perf}$, and $Reg_{award}$ to perform frequency regulation.

High level coordinator 112 is shown receiving a regulation signal from incentive provider 114. The regulation signal may specify a portion of the regulation award $Reg_{award}$ that high level coordinator 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

High level coordinator 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, high level coordinator 112 uses a battery life model to quantify and monetize battery degradation as a function of the power setpoints provided to power inverter 106. Advantageously, the battery life model allows high level coordinator 112 to perform an optimization that weighs the revenue generation potential of participating in the frequency response program against the cost of battery degradation and other costs of participation (e.g., less battery power available for campus 102, increased electricity costs, etc.). In some embodiments, high level coordinator 112 operates to generate battery power setpoints as described in U.S. patent application Ser. No. 15/426,962 filed Feb. 7, 2017, the entire disclosure of which is incorporated by reference herein.

Building and Campus HVAC Systems

Figure 1B:
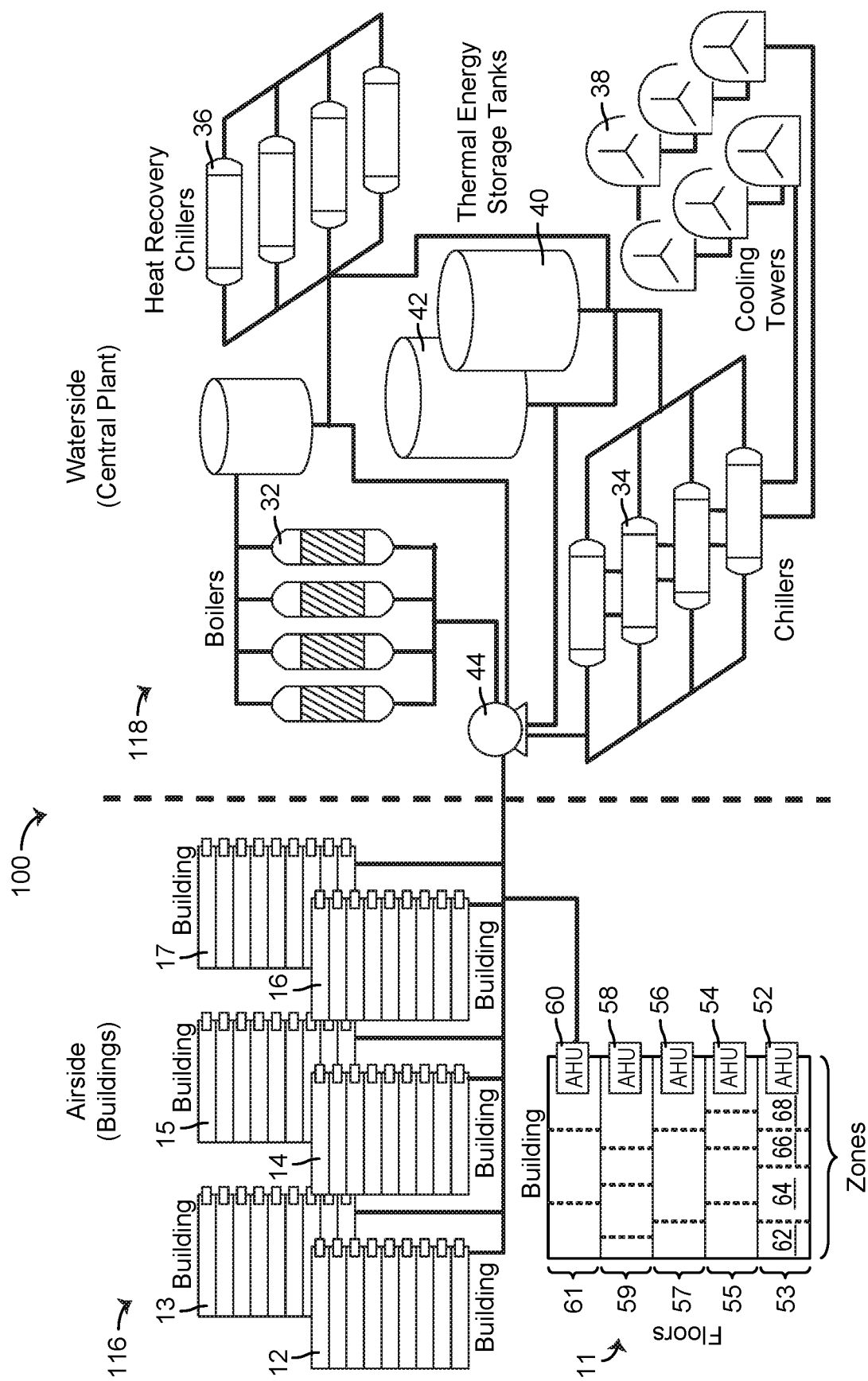
FIG. 1B is a drawing of a portion of the control system of FIG. 1 showing an airside system and a waterside system, according to an exemplary embodiment.

Referring now to FIG. 1B, a portion of control system 100 is shown in greater detail, according to an exemplary embodiment. FIG. 1B is a schematic diagram of a large-scale control system 100 including central plant 118 (i.e., a waterside system) and buildings 116 (i.e., an airside system). Central plant 118 is shown to include boilers 32, chillers 34, heat recovery chillers 36, cooling towers 38, a cold thermal energy storage (TES) tank 40, a hot TES tank 42, and a pump 44. The equipment of central plant 118 can operate to heat or chill a working fluid (e.g., water, glycol, etc.) and provide the working fluid to buildings 116. Buildings 116 can use the heated fluid or chilled fluid from central plant 118 to heat or cool airflows provided to various building zones. Examples of a waterside system and airside system which can be used in control system 100 are described in greater detail with reference to FIGS. 2-3.

In the campus-wide implementation shown in FIG. 1A, buildings 116 are shown to include multiple buildings 11-17. Buildings 116 can include multiple air handling units (AHUs) distributed across buildings 11-17. In some embodiments, the AHUs are rooftop AHUs located on the rooftops of buildings 11-17. In other embodiments, the AHUs can be distributed across multiple floors or zones of buildings 11-17. Each of buildings 11-17 can include one or more AHUs. For example, building 11 is shown to include a first AHU 52 located on the first floor 53, a second AHU 54 located on the second floor 55, a third AHU 56 located on the third floor 57, a fourth AHU 58 located on the fourth floor 59, and a fifth AHU 60 located on the fifth floor 61.

Each AHU of buildings 116 can receive the heated fluid and/or the chilled fluid from central plant 118 and can use such fluids to provide heating or cooling for various building zones. Each AHU can be configured to provide airflow to a single building zone or multiple building zones. For example, AHU 52 can be configured to provide airflow to building zones 62, 64, 66, and 68. In a large scale HVAC system, buildings 116 can include a large number of buildings (e.g., tens, hundreds, etc.) with each building having multiple AHUs and a large number of building zones. Each building zone can be controlled independently (e.g., via dampers or variable air volume (VAV) units) and can have different temperature setpoints. In some embodiments, the control objective for control system 100 is to determine the appropriate temperature setpoints for all of the building zones and to operate the equipment of central plant 118, buildings 116, and battery 108 to meet the corresponding load.

Waterside System

Figure 2:
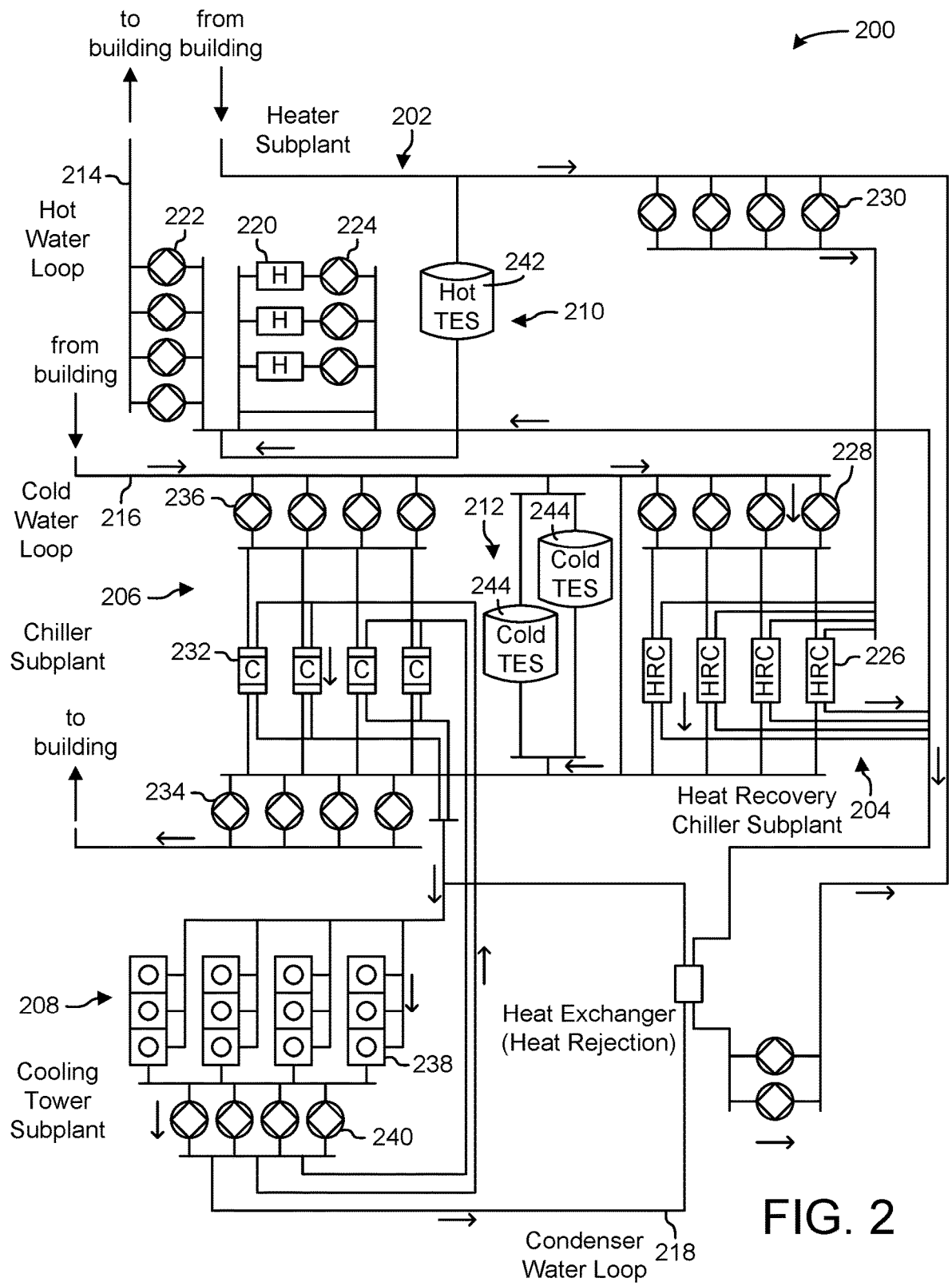
FIG. 2 is a schematic diagram of a central plant which can be implemented as the waterside system of FIG. 1B, according to an exemplary embodiment.

Referring now to FIG. 2, a block diagram of a waterside system 200 is shown, according to some embodiments. In some embodiments, waterside system 200 can supplement or replace central plant 118 in control system 100. Waterside system 200 can include some or all of the HVAC devices shown in FIG. 1B (e.g., boilers 32, chillers 34, heat recovery chillers 36, etc.) and can operate to supply a heated or chilled fluid to buildings 116. The HVAC devices of waterside system 200 can be located within buildings 116 or at an offsite location such as a central plant (as shown in FIG. 1B).

Waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and buildings 11-17. Chiller subplant 206 can be configured to chill water in a cold water loop 216 that circulates the cold water between chiller subplant 206 buildings 11-17. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to AHUs located on the rooftop of buildings 11-17 or to individual floors or zones of buildings 11-17 (as shown in FIG. 1B). The AHUs push air past heat exchangers (e.g., heating coils or cooling coils) through which the water flows to provide heating or cooling for the air. The heated or cooled air can be delivered to individual zones of buildings 11-17 to serve the thermal energy loads of buildings 11-17. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
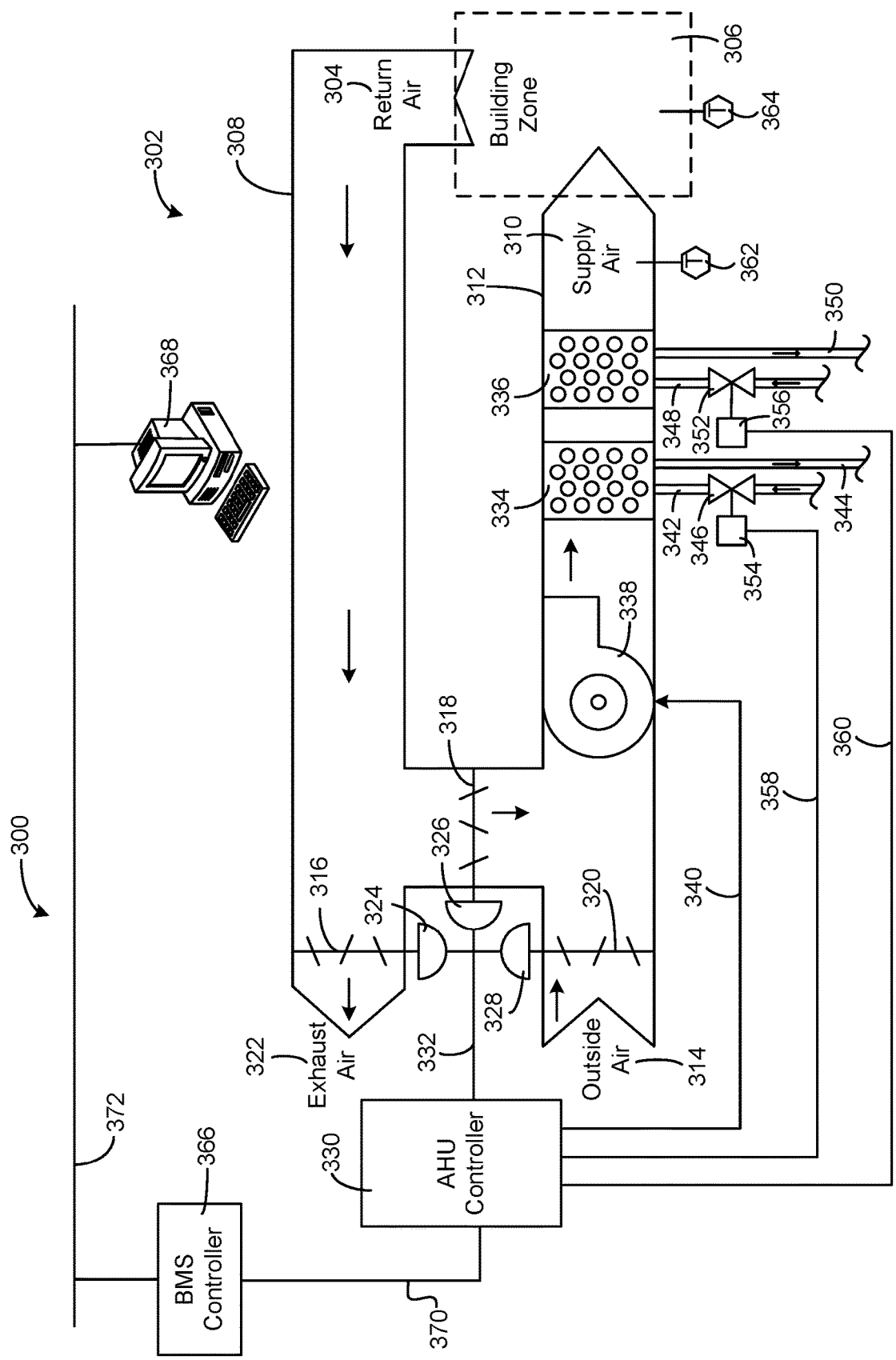
FIG. 3 is a schematic diagram of an air handling unit (AHU) which can be implemented as part of the airside system of FIG. 1B, according to an exemplary embodiment.

Referring now to FIG. 3, a block diagram of an airside system 300 is shown, according to some embodiments. In some embodiments, airside system 300 can supplement or replace the airside equipment in buildings 11-17 in control system 100. Airside system 300 can include some or all of the HVAC devices in buildings 11-17 (e.g., AHUs 52-60) and can be located in or around buildings 11-17. Airside system 300 can operate to heat or cool an airflow provided to buildings 11-17 using a heated or chilled fluid provided by waterside system 200.

Airside system 300 is shown to include an economizer-type AHU 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of buildings 11-17 or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, and/or other controllable systems that serve buildings 11-17. BMS controller 366 can communicate with multiple downstream building systems or subsystems (e.g., HVAC systems, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the equipment of control system 100. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management Systems

Figure 4:
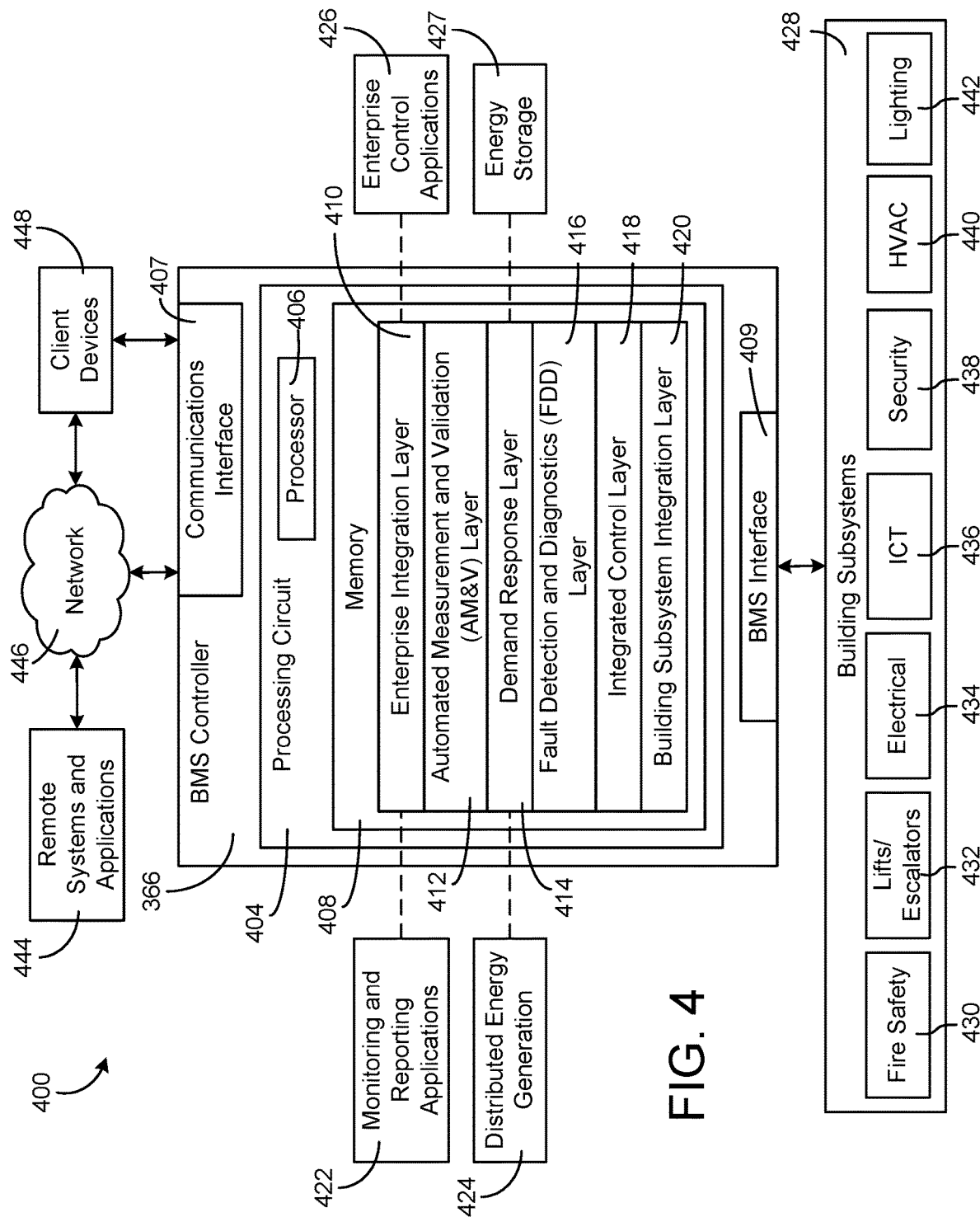
FIG. 4 is a block diagram of a building management system which can receive control signals from the control system of FIG. 1A, according to an exemplary embodiment.

Referring now to FIG. 4, a block diagram of a building management system (BMS) 400 is shown, according to an exemplary embodiment. BMS 400 can be implemented in one or more of buildings 11-17 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control buildings 11-17. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as the systems described with reference to FIGS. 1A-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within buildings 11-17. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of buildings 11-17. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
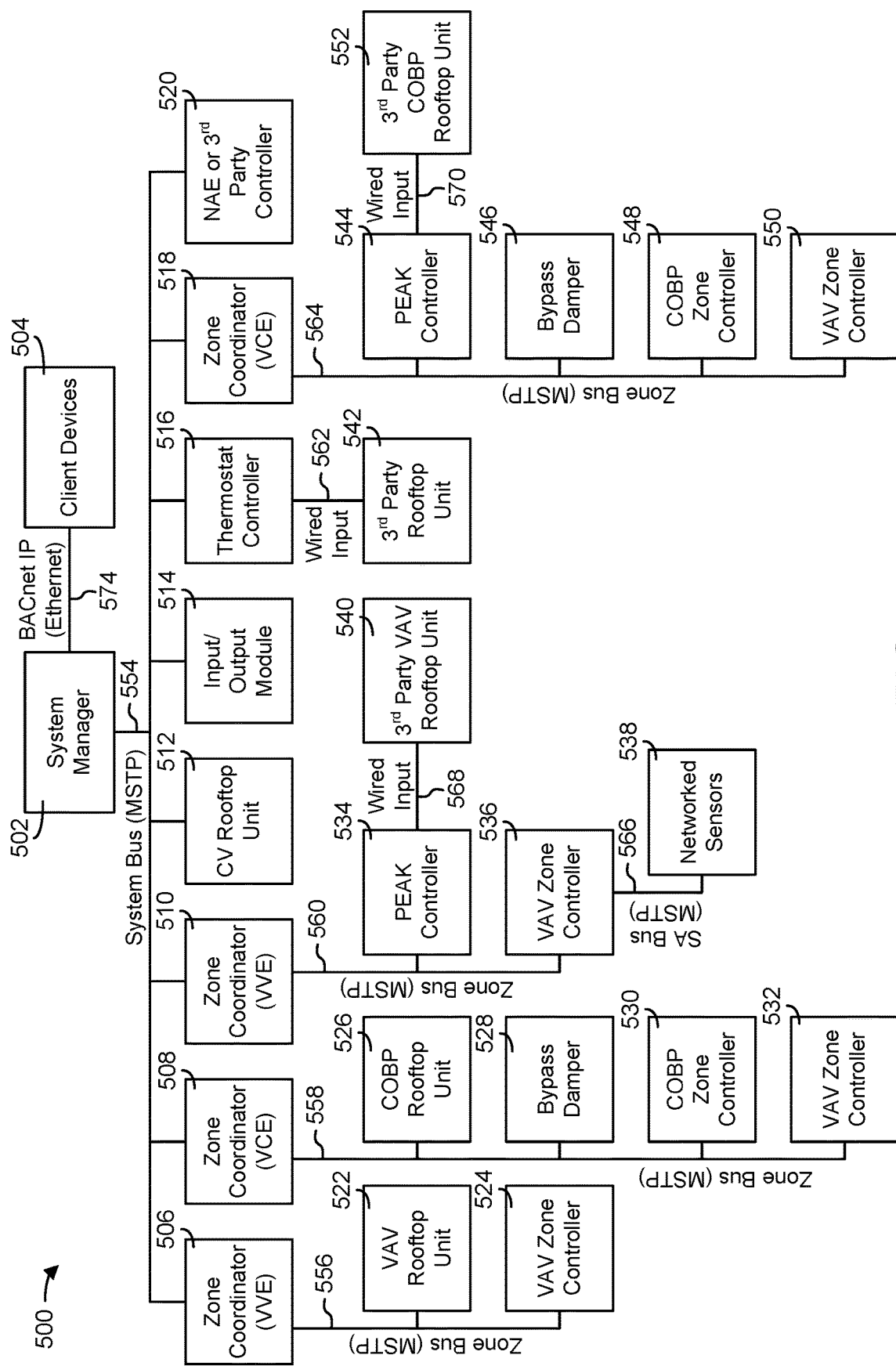
FIG. 5 is a block diagram of another building management system which can receive control signals from the control system of FIG. 1A, according to an exemplary embodiment.

Referring now to FIG. 5, a block diagram of another building management system (BMS) 500 is shown, according to some embodiments. BMS 500 can be implemented in one or more of buildings 11-17 and used to monitor and control the devices of HVAC systems 20 and 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 644, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control algorithms, feedback control algorithms, etc.) to control a variable state or condition (e.g., temperature, humidity, airflow, lighting, etc.) in or around buildings 116.

Hierarchical Control System

Figure 6A:
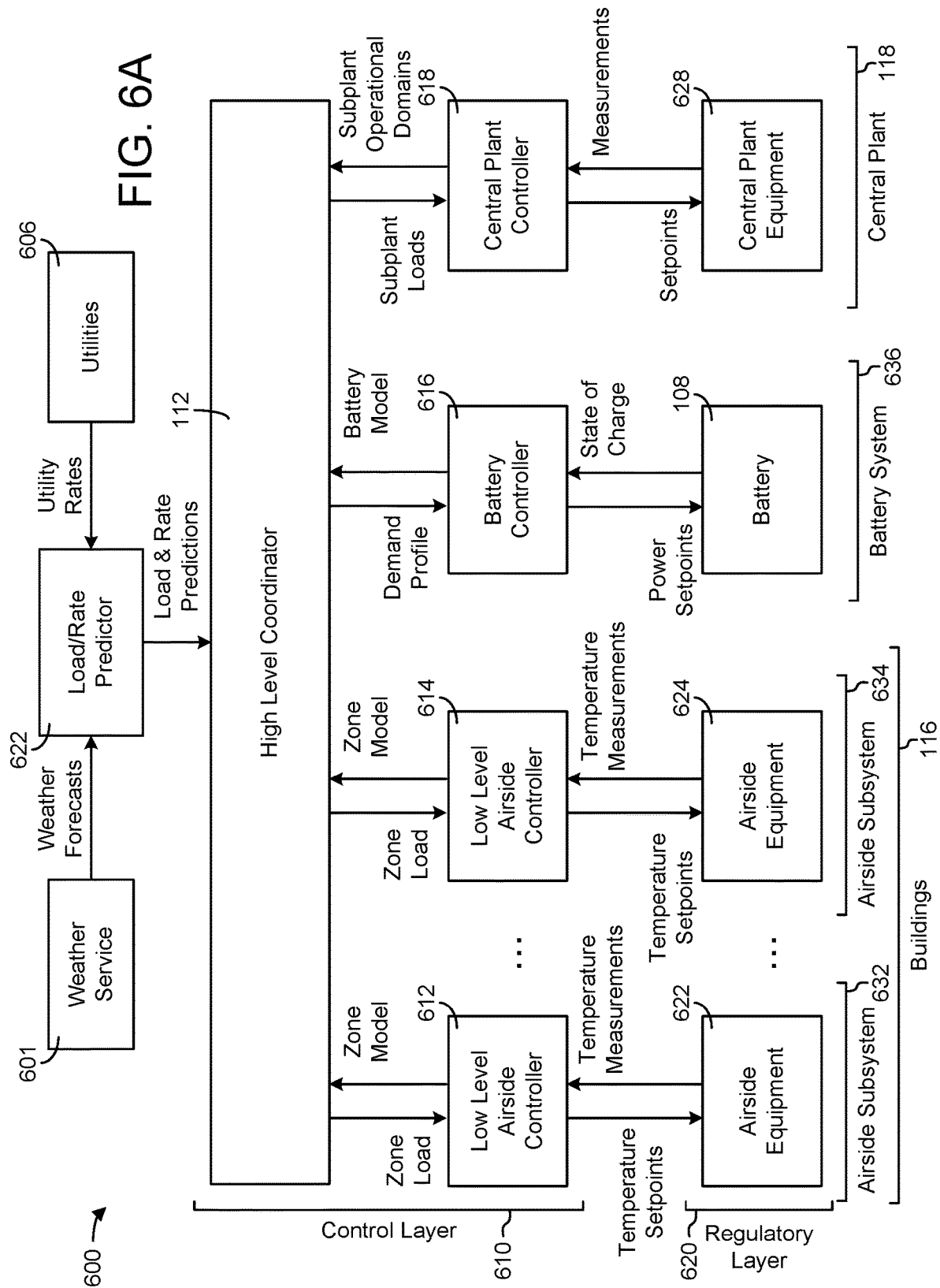
FIG. 6A is a block diagram of a hierarchical control system including a high level coordinator, a plurality of low level airside controllers, a battery controller, and a central plant controller, according to an exemplary embodiment.

Referring now to FIG. 6A, a block diagram of a hierarchical control system 600 is shown, according to some embodiments. Control system 600 uses a cascaded or hierarchical control technique to determine optimal setpoints for the equipment of an airside system, a waterside system, and/or distributed energy storage (e.g., batteries) over a time horizon. Control system 600 can be used in combination with control system 100, waterside system 200, airside system 300, BMS 400, and/or BMS 500, as described with reference to FIGS. 1A-5. For example, control system 600 can determine optimal temperature setpoints for the airside equipment 622-624 of buildings 116 and/or airside system 300. Similarly, control system 600 can determine optimal setpoints for the waterside equipment (i.e., central plant equipment 628) of central plant 118 and for battery 108 of a battery system 636. Setpoints for central plant equipment 628 may include load setpoints for one or more subplants, load setpoints for thermal energy storage, and/or charge or discharge rates for thermal energy storage.

In some embodiments, one or more components of control system 600 can be omitted. For example, battery system 636 can be omitted such that control system 600 includes only airside subsystems 632-634 and central plant 118. In this scenario, both battery controller 616 and battery 108 may not be present in control system 600. Control system 600 can be configured to automatically adapt to different combinations of components. For example, if battery system 636 is omitted, control system 600 can automatically reconfigure the optimization or control technique to function with only high level coordinator 112, airside subsystems 632-634, and central plant 118.

In some embodiments, control system 600 uses model predictive control (MPC). MPC is a control technique that uses a model of a controlled system to relate system inputs (e.g., control actions, setpoints, etc.) to system states and system outputs (e.g., measurements, process variables, etc.). The model can be used to predict the system states and system outputs based on the actions taken by a controller at each time step during an optimization period. At each time step, MPC solves an online optimization problem using the system model to determine a sequence of control actions that achieve an objective (e.g., minimizing tracking error, minimizing energy cost, etc.) while respecting process constraints such as equipment capacity and safety bounds (e.g., temperature constraints, equipment switching constraints, etc.). The first control action in the sequence is implemented and the optimization problem is solved again at the next time step after new measurements are obtained.

In economic MPC, the objective in the optimization problem is often to minimize total cost, as defined by a cost function. Numerous studies have shown that MPC outperforms existing control systems due to its ability to forecast into the future and anticipate events before they occur. MPC enables shifting of the energy load from peak hours to off-peak hours by using the mass of the building for passive thermal energy storage (TES). Active thermal energy storage (e.g., chilled water tanks, hot water tanks, etc.) can also be used to further facilitate load shifting. Through a combination of active and passive storage systems, energy costs can be decreased by concentrating equipment usage to times of low resource prices, all while maintaining comfort limits within each building.

Still referring to FIG. 6A, control system 600 is shown to include a control layer 610 and a regulatory layer 620. Control layer 610 is shown to include high level coordinator 112 and several low level controllers 612-618. Controllers 612 and 614 are shown as low level airside controllers, controller 616 is shown as a battery controller, and controller 618 is shown as a central plant controller. Control layer 610 can be configured to determine and provide optimal temperature setpoints and equipment operating setpoints to the equipment of regulatory layer 620. In some embodiments, control layer 610 can be retrofit to any existing BMS to provide setpoint optimization for the airside equipment and waterside equipment of the BMS.

Regulatory layer 620 is shown to include airside equipment 622-624, battery 108, and central plant equipment 628. Airside equipment 622-624 can include some or all of the equipment of buildings 116 and/or airside system 300, as described with reference to FIGS. 1A-1B and FIG. 3. Central plant equipment 628 can include some or all of the equipment of central plant 118 and/or waterside system 200, as described with reference to FIGS. 1B-2 (e.g., subplants, thermal energy storage, etc.). In some embodiments, regulatory layer 620 includes some or all of the equipment of BMS 400 and/or BMS 500, as described with reference to FIGS. 4-5. For example, regulatory layer 620 can include PID controllers, operable equipment (e.g., chillers, boilers, air handling units, etc.), and/or other systems or devices configured to control a process variable to a setpoint.

In some embodiments, control system 600 includes a load/rate predictor 622. Load/rate predictor 622 can provide control layer 610 with load and rate predictions including, for example, disturbance forecasts, electricity prices, demand charge prices, and outside air temperatures. Load/rate predictor 622 is shown receiving weather forecasts from a weather service 601. In some embodiments, load/rate predictor 622 generates the disturbance forecasts as a function of the weather forecasts. In some embodiments, load/rate predictor 622 uses feedback from regulatory layer 620 to generate the disturbance forecasts. Feedback from regulatory layer 620 can include various types of sensory inputs (e.g., temperature, flow, humidity, enthalpy, etc.) or other data relating to the controlled building or campus (e.g., building occupancy data, building electric load, etc.). In some embodiments, load/rate predictor 622 generates a disturbance forecast including a predicted disturbance value for each time step within the optimization period.

In some embodiments, load/rate predictor 622 uses a deterministic plus stochastic model trained from historical load data to generate the disturbance forecast. Load/rate predictor 622 can use any of a variety of prediction methods to generate the disturbance forecast (e.g., linear regression for the deterministic portion and an autoregressive model for the stochastic portion). Load/rate predictor 622 can predict one or more different types of disturbances for the building or campus. For example, load/rate predictor 622 can predict a thermal load resulting from heat transfer between the air within a building and the outside air through the walls of the building. Load/rate predictor 622 can predict a thermal load resulting from internal heat generation within the building (e.g., heat generated by electronics in the building, heat generated by building occupants, etc.). In some embodiments, load/rate predictor 622 makes load/rate predictions using the techniques described in U.S. patent application Ser. No. 14/717,593, titled "Building Management System for Forecasting Time Series Values of Building Variables" and filed May 20, 2015, the entire disclosure of which is incorporated by reference herein.

Load/rate predictor 622 is shown receiving utility rates from utilities 606. Utility rates can indicate a cost or price per unit of a resource (e.g., electricity, natural gas, water, etc.) provided by utilities 606 at each time step in the optimization period. In some embodiments, the utility rates are time-variable rates. For example, the price of electricity can be higher at certain times of day or days of the week (e.g., during high demand periods) and lower at other times of day or days of the week (e.g., during low demand periods). The utility rates can define various time periods and a cost per unit of a resource during each time period. Utility rates can be actual rates received from utilities 606 or predicted utility rates estimated by load/rate predictor 622.

In some embodiments, the utility rates include demand charges for one or more resources provided by utilities 606. A demand charge can define a separate cost imposed by utilities 606 based on the maximum usage of a particular resource (e.g., maximum energy consumption) during a demand charge period. The utility rates can define various demand charge periods and one or more demand charges associated with each demand charge period. In some instances, demand charge periods can overlap partially or completely with each other and/or with the optimization period. Advantageously, control layer 610 can account for demand charges in the high level optimization process performed by high level coordinator 112. Utilities 606 can be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 can store the predicted loads and the utility rates in memory and/or provide the predicted loads and the utility rates to high level coordinator 112.

Control layer 610 can receive measurements from regulatory layer 620 and provide setpoints to regulatory layer 620. Control layer 610 can generate optimal values for various decision variables including, for example, zone temperature setpoints, equipment on/off decisions, TES charging/discharging rates, and battery power setpoints. Control layer 610 can determine the optimal values of the decision variables using system models such a zone temperature to cooling/heating duty model, a cooling/heating duty to temperature setpoint model, equipment models, and active TES models. Control layer 610 can determine the optimal values of the decision variables by performing an optimization process subject to several constraints. The constraints can include comfort bounds on the zone air temperatures, equipment capacity constraints, TES tank size, battery charge/discharge rates, and rate of change bounds on the equipment of regulatory layer 620.

As discussed above, solving a single MPC problem to determine the optimal values of the decision variables can be difficult for large-scale applications. For example, buildings 116 can include thousands of discrete zones and central plant 118 can include thousands of unique HVAC devices. The discrete decisions (e.g., turning equipment on/off) can result in a mixed integer optimization problem, which further increases complexity. Due to the difficulty and computational complexity of the MPC problem, control layer 610 can decompose the overall MPC problem into smaller, more manageable, optimization problems.

As shown in FIG. 6A, control system 600 can decompose the overall MPC problem into a high level optimization problem and a low level optimization problem. The high level problem can be solved by high level coordinator 112 to determine a load profile for each low level airside subsystem 632-634, a demand profile for battery system 636, and subplant load profiles for central plant 118. In some embodiments, high level coordinator 112 uses active TES models and aggregate low level models for each airside subsystem 632-634 to reduce computational complexity. High level coordinator 112 can determine load profiles that optimize (e.g., minimize) the total operational cost of control system 600 over the optimization period. Each load profile can include a load value for each time step in the optimization period. Low level airside controllers 612-614 can use the load profiles as constraints defining maximum permissible load values for each airside subsystem 632-634 for each time step in the optimization period. High level coordinator 112 can provide the load profiles to each of the low level airside controller 612-614. The high level optimization performed by high level coordinator 112 is described in greater detail with reference to FIG. 7.

The low level optimization problem can be further decomposed into a low level waterside optimization problem, a low level battery optimization problem, and one or more low level airside optimization problems. Each low level airside problem can be solved by one of low level airside controllers 612-614 to determine zone temperature setpoints for the airside equipment 622-624 of each airside subsystem 632-634. Each low level airside controller 612-614 can determine the zone temperature setpoints that optimize (e.g., minimize) the energy consumption of the corresponding airside subsystem 632-634 while maintaining zone temperatures within defined temperature limits and without exceeding the load values provided by high level coordinator 112. Alternatively, each low level airside controller 612-614 can determine temperature setpoints that track the average building temperatures (e.g., predicted building temperature states) from the high level optimization problem. The low level optimization performed by low level controllers 612-614 is described in greater detail with reference to FIG. 8.

The low level waterside problem can be solved by central plant controller 618. In some embodiments, the low level waterside problem is a mixed-integer linear program. Central plant controller 618 can determine optimal setpoints for central plant equipment 628 that minimize operating cost while meeting the demand profile from high level coordinator 112. Decision variables optimized by central plant controller 618 can include, for example, equipment on/off states, thermal loads for chillers, flow rates for pumps, setpoints for other auxiliary waterside equipment, and TES charge/discharge rates. Central plant controller 618 can use the demand profile from high level coordinator 112 as an input specifying the overall demand to be met by central plant 118 at each time step of the optimization period.

In some embodiments, low level waterside controller 628 decomposes the low level waterside optimization problem into a first waterside optimization problem and a second waterside optimization problem. The first waterside optimization problem can allocate the demand specified by high level coordinator 112 across multiple subplants of the waterside system (e.g., heater subplant 202, heat recovery chiller subplant 204, chiller subplant 206, cooling tower subplant 208, hot TES subplant 210, and cold TES subplant 212). The second waterside optimization problem can be decomposed into a mixed-integer optimization problem for each subplant to determine optimal equipment on/off states and equipment setpoints for central plant equipment 628. An example of a waterside optimization technique which can be used by low level waterside controller 628 is described in detail in U.S. patent application Ser. No. 14/634,609 filed Feb. 27, 2015, the entire disclosure of which is incorporated by reference herein. In other embodiments, high level coordinator 112 provides individualized subplant loads for each of the subplants of central plant 118 as an input to central plant controller 618.

As shown in FIG. 6A, each low level airside model predictive controller 612-614 can control a subsystem 632-634 of buildings 116. Each low level airside controller 612-614 can perform a separate airside optimization process to determine optimal temperature setpoints for the airside equipment 622-624 of the corresponding airside subsystem 632-634. Each airside subsystem 632-634 (e.g., each building) can include multiple AHUs, each of which can be configured to deliver air to multiple building zones. Accordingly, each airside system 632-634 can include many building zones.

In some embodiments, high level coordinator 112 uses an aggregate model of each airside subsystem 632-634 and allocates a thermal energy load to each airside subsystem 632-634. Low level airside controllers 612-626 can use more detailed zone-level models during the low level optimization processes to determine the optimal temperature setpoints for each building zone of the corresponding airside subsystem. Decomposing buildings 116 into separate airside subsystems 632-634 can improve computational performance and substantially decrease the amount of time required to solve the low level controller problems. For example, all of the low level controller problems can be solved within a few minutes.

In some embodiments, each airside subsystem 632-634 represents a separate building. Significant coupling between airside subsystems 632-634 (e.g., heat exchange between subsystems 632-634) can affect performance since low level controllers 612-614 are not required to coordinate their solutions. One way to decompose airside subsystems 632-634 to guarantee that there is no coupling between subsystems 632-634 is to decompose by building since separate buildings do not exchange heat with one another. For this reason, it may be desirable to select airside subsystems 632-634 so that each airside subsystem 632-634 represents a separate building. In other embodiments, each airside subsystem 632-634 can represent a single building zone, a collection of zones within a building, or even multiple buildings.

In control system 600, high level coordinator 112 determines the thermal energy loads to allocate to each airside subsystem 632-634 (e.g., each building), the demand profile for battery system 636 (i.e., a profile of battery power setpoints), and the demand profile for central plant 118 (i.e., subplant loads). Each airside subsystem 632-634 can include a separate low level airside controller 612-614 that computes the temperature setpoints for each zone in that airside subsystem 632-634 (e.g., each zone in the building). If each low level airside subsystem 632-634 represents a separate building the low level airside problem can be solved in a distributed manner since there is no heat transfer between the separate buildings. The low level airside problem can be easily extended to handle large industrial and campus-wide implementations without increasing computational complexity.

Figure 6B:
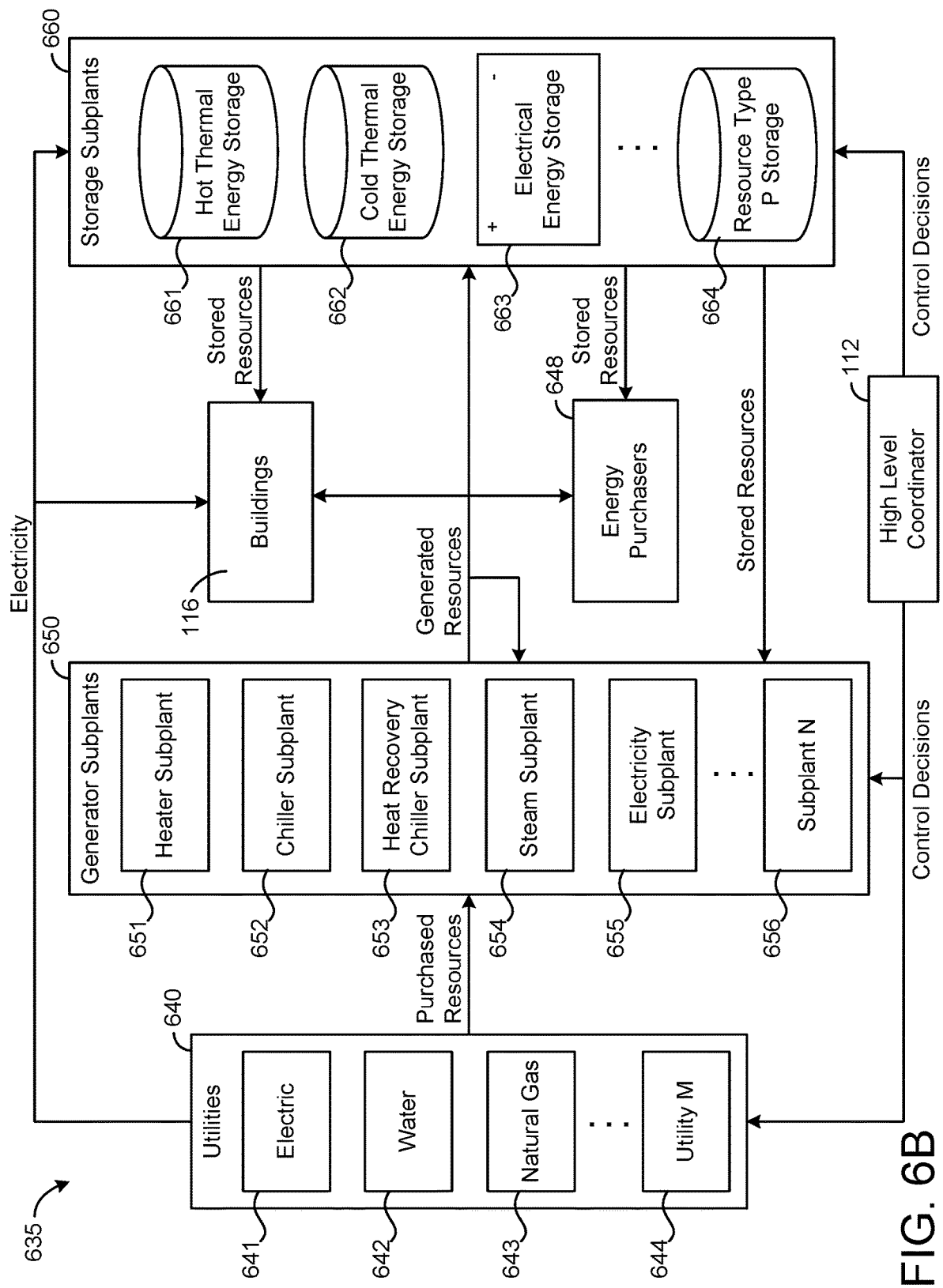
FIG. 6B is a block diagram of an energy storage system in which the high level coordinator of FIG. 6A can be implemented, according to an exemplary embodiment.
Figure 6C:
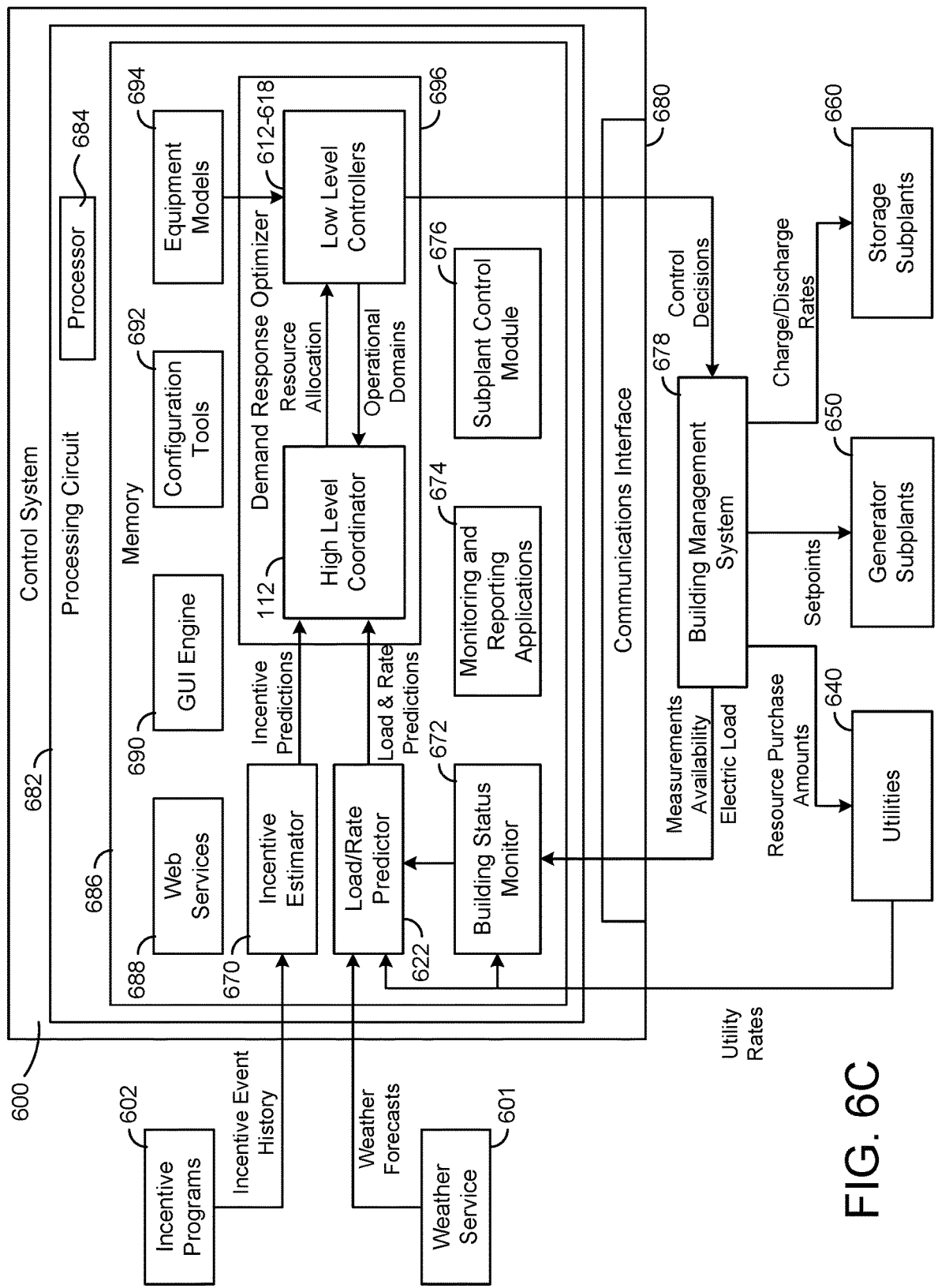
FIG. 6C is a block diagram illustrating a portion of the control system of FIG. 6A in greater detail, according to an exemplary embodiment.

In some embodiments, one or more of low level controllers 612, 614, 616, and/or 618 may be implemented as modules of a controller that includes both high level coordinator 112 and low level controllers 612-618 (as shown in FIG. 6C). Similarly, high level coordinator 112 may include a plurality of modules, each of which is configured to modify the high level optimization based on the presence or absence of corresponding components of control system 600. If one or more components of control system 600 are not present, the corresponding low level controllers 612-618 and/or modules can be deactivated and the corresponding variables, constraints, and terms can be automatically omitted from the high level optimization performed by high level coordinator 112. For example, if central plant equipment 628 are not present, central plant controller 618 (or the central plant module) may be deactivated and high level coordinator 112 may automatically adjust the high level optimization to omit any variables, constraints, or terms that relate to central plant equipment 628 (i.e., omitting generating the subplant load profile). Similarly, if airside equipment 622-624 are not present, low level airside controllers 612-614 (or the airside modules) may be deactivated and high level coordinator 112 may automatically adjust the high level optimization to omit any variables, constraints, or terms that relate to airside equipment 622-624 (i.e., omitting generating the airside load profile). As another example, if battery 108 is not present, battery controller 616 (or the battery module) may be deactivated and high level coordinator 112 may automatically adjust the high level optimization to omit any variables, constraints, or terms that relate to battery 108 (i.e., omitting generating the battery power profile).

Control system 600 provides several advantages over alternative control strategies. For example, high level coordinator 112 can coordinate operation low level airside subsystems 632-634 via the load profiles provided to each low level controller 612-614. By including a demand charge in the high level objective function, high level coordinator 112 can generate load profiles which stager the operation of low level airside subsystems 632-634. In other words, high level coordinator 112 can generate load profiles which ensure that low level airside subsystems 632-634 do not all consume power at the same time. This allows high level coordinator 112 to coordinate operation of low level airside subsystems 632-634 and account for the demand charge without requiring communication between low level airside controllers 612-614. The coupling caused by the presence of a single central plant 118 and a single battery system 636 for all airside subsystems 632-634 is also addressed by high level coordinator 112. Hence, the low level control problems are completely decoupled such that iterations and communication between low level controllers 612-614 are not required.

Data communication between control layer 610 and regulatory layer 620 can also be greatly reduced. For example, data communication between control layer 610 and regulatory layer 620 can be limited to measurements and setpoints, as shown in FIG. 6A. This allows control system 600 to be integrated with any existing BMS. High level coordinator 112 can use aggregate models of each airside subsystem 632-634 and central plant 118 to reduce computational complexity during the high level optimization. Each low level airside controller 612-614 can provide high level coordinator 112 with an aggregate disturbance estimate, an aggregate building temperature, and aggregate system parameters (e.g., thermal capacitance, heat transfer coefficient, etc.) for the corresponding airside subsystem 632-634.

Control system 600 can be used to control a variety of different systems including, for example, a chiller plant, air handling units, rooftop units, variable refrigerant flow systems, airside systems, waterside systems, building management systems, and/or other types of systems for which power consumption or thermal energy loads can be allocated to different subsystems. Most building temperature regulation methods do not consider detailed models of central plant equipment 628 or integer decision variables, which decreases the fidelity of energy cost calculations. However, control system 600 can include integer variables in the waterside optimization problem to determine when to turn equipment on and off rather than relying on heuristics. Active TES can also be used in the waterside optimization problem, which allows for the greatest potential for load shifting and cost savings. However, control system 600 can still be applied generally, whether or not active TES is available.

Energy Storage System with Thermal and Electrical Energy Storage

Referring now to FIG. 6B, a block diagram of an energy storage system 635 is shown, according to an exemplary embodiment. Energy storage system 635 is shown to include buildings 116. Buildings 116 may be equipped with a HVAC system and/or a building management system that operates to control conditions within buildings 116. In some embodiments, buildings 116 include multiple buildings (i.e., a campus) served by energy storage system 635. Buildings 116 may demand various resources including, for example, hot thermal energy (e.g., hot water), cold thermal energy (e.g., cold water), and/or electrical energy. The resources may be demanded by equipment or subsystems within buildings 116 or by external systems that provide services for buildings 116 (e.g., heating, cooling, air circulation, lighting, electricity, etc.). Energy storage system 635 operates to satisfy the resource demand associated with buildings 116.

Energy storage system 635 is shown to include a plurality of utilities 640. Utilities 640 may provide energy storage system 635 with resources such as electricity, water, natural gas, or any other resource that can be used by energy storage system 635 to satisfy the demand of buildings 116. For example, utilities 640 are shown to include an electric utility 641, a water utility 642, a natural gas utility 643, and utility M 644, where M is the total number of utilities 640. In some embodiments, utilities 640 are commodity suppliers from which resources and other types of commodities can be purchased. Resources purchased from utilities 640 can be used by generator subplants 650 to produce generated resources (e.g., hot water, cold water, electricity, steam, etc.), stored in storage subplants 660 for later use, or provided directly to buildings 116. For example, utilities 640 are shown providing electricity directly to buildings 116 and storage subplants 660.

Energy storage system 635 is shown to include a plurality of generator subplants 650. In some embodiments, generator subplants 650 are components of a central plant (e.g., central plant 118). Generator subplants 650 are shown to include a heater subplant 651, a chiller subplant 652, a heat recovery chiller subplant 653, a steam subplant 654, an electricity subplant 655, and subplant N 656, where N is the total number of generator subplants 650. Generator subplants 650 may be configured to convert one or more input resources into one or more output resources by operation of the equipment within generator subplants 650. For example, heater subplant 651 may be configured to generate hot thermal energy (e.g., hot water) by heating water using electricity or natural gas. Chiller subplant 652 may be configured to generate cold thermal energy (e.g., cold water) by chilling water using electricity. Heat recovery chiller subplant 653 may be configured to generate hot thermal energy and cold thermal energy by removing heat from one water supply and adding the heat to another water supply. Steam subplant 654 may be configured to generate steam by boiling water using electricity or natural gas. Electricity subplant 655 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 650 may be provided by utilities 640, retrieved from storage subplants 660, and/or generated by other generator subplants 650. For example, steam subplant 654 may produce steam as an output resource. Electricity subplant 655 may include a steam turbine that uses the steam generated by steam subplant 654 as an input resource to generate electricity. The output resources produced by generator subplants 650 may be stored in storage subplants 660, provided to buildings 116, sold to energy purchasers 648, and/or used by other generator subplants 650. For example, the electricity generated by electricity subplant 655 may be stored in electrical energy storage 663, used by chiller subplant 652 to generate cold thermal energy, provided to buildings 116, and/or sold to energy purchasers 648.

Energy storage system 635 is shown to include storage subplants 660. In some embodiments, storage subplants 660 are components of a central plant (e.g., central plant 118). Storage subplants 660 may be configured to store energy and other types of resources for later use. Each of storage subplants 660 may be configured to store a different type of resource. For example, storage subplants 660 are shown to include hot thermal energy storage 661 (e.g., one or more hot water storage tanks), cold thermal energy storage 662 (e.g., one or more cold thermal energy storage tanks), electrical energy storage 663 (e.g., one or more batteries), and resource type P storage 664, where P is the total number of storage subplants 660. The resources stored in subplants 660 may be purchased directly from utilities 640 or generated by generator subplants 650.

In some embodiments, storage subplants 660 are used by energy storage system 635 to take advantage of price-based demand response (PBDR) programs. PBDR programs encourage consumers to reduce consumption when generation, transmission, and distribution costs are high. PBDR programs are typically implemented (e.g., by utilities 640) in the form of energy prices that vary as a function of time. For example, utilities 640 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 660 allows for the resources to be purchased at times when the resources are relatively less expensive (e.g., during non-peak electricity hours) and stored for use at times when the resources are relatively more expensive (e.g., during peak electricity hours). Storing resources in subplants 660 also allows the resource demand of buildings 116 to be shifted in time. For example, resources can be purchased from utilities 640 at times when the demand for heating or cooling is low and immediately converted into hot or cold thermal energy by generator subplants 650. The thermal energy can be stored in storage subplants 660 and retrieved at times when the demand for heating or cooling is high. This allows energy storage system 635 to smooth the resource demand of buildings 116 and reduces the maximum required capacity of generator subplants 650. Smoothing the demand also allows energy storage system 635 to reduce the peak electricity consumption, which results in a lower demand charge.

In some embodiments, storage subplants 660 are used by energy storage system 635 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 640 or by an independent service operator (ISO). IBDR programs supplement traditional utility-owned generation, transmission, and distribution assets with additional options for modifying demand load curves. For example, stored energy can be sold to energy purchasers 648 (e.g., an energy grid) to supplement the energy generated by utilities 640. In some instances, incentives for participating in an IBDR program vary based on how quickly a system can respond to a request to change power output/consumption. Faster responses may be compensated at a higher level. Advantageously, electrical energy storage 663 allows system 635 to quickly respond to a request for electric power by rapidly discharging stored electrical energy to energy purchasers 648. System 600 can participate in IBDR programs using electrical energy storage 663 to store and discharge electricity, using thermal energy storage 661-662 to store and discharge thermal energy, and/or by reducing or curtailing the consumption of various resources from utilities 640 (without requiring any type of electrical or thermal energy storage).

Still referring to FIG. 6B, energy storage system 635 is shown to include high level coordinator 112. High level coordinator 112 may be configured to control the distribution, production, storage, and usage of resources in energy storage system 635. In some embodiments, high level coordinator 112 performs an optimization process determine an optimal set of control decisions for each time step within an optimization period. The control decisions may include, for example, an optimal amount of each resource to purchase from utilities 640, an optimal amount of each resource to produce or convert using generator subplants 650, an optimal amount of each resource to store or remove from storage subplants 660, an optimal amount of each resource to sell to energy purchasers 648, and/or an optimal amount of each resource to provide to buildings 116. In some embodiments, the control decisions include an optimal amount of each input resource and output resource for each of generator subplants 650.

High level coordinator 112 may be configured to maximize the economic value of operating energy storage system 635 over the duration of the optimization period. The economic value may be defined by a value function that expresses economic value as a function of the control decisions made by high level coordinator 112. The value function may account for the cost of resources purchased from utilities 640, revenue generated by selling resources to energy purchasers 648, and the cost of operating energy storage system 635. In some embodiments, the cost of operating energy storage system 635 includes a cost for losses in battery capacity as a result of the charging and discharging electrical energy storage 663. The cost of operating energy storage system 635 may also include a cost of excessive equipment start/stops during the optimization period.

Each of subplants 650-660 may include equipment that can be controlled by high level coordinator 112 to optimize the performance of energy storage system 635. Subplant equipment may include, for example, heating devices, chillers, heat recovery heat exchangers, cooling towers, energy storage devices, pumps, valves, and/or other devices of subplants 650-660. Individual devices of generator subplants 650 can be turned on or off to adjust the resource production of each generator subplant. In some embodiments, individual devices of generator subplants 650 can be operated at variable capacities (e.g., operating a chiller at 10% capacity or 60% capacity) according to an operating setpoint received from high level coordinator 112.

In some embodiments, one or more of subplants 650-660 includes a subplant level controller configured to control the equipment of the corresponding subplant. For example, high level coordinator 112 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, high level coordinator 112 maximizes the life cycle economic value of energy storage system 635 while participating in PBDR programs, IBDR programs, or simultaneously in both PBDR and IBDR programs. For the IBDR programs, high level coordinator 112 may use statistical estimates of past clearing prices, mileage ratios, and event probabilities to determine the revenue generation potential of selling stored energy to energy purchasers 648. For the PBDR programs, high level coordinator 112 may use predictions of ambient conditions, facility thermal loads, and thermodynamic models of installed equipment to estimate the resource consumption of subplants 650. High level coordinator 112 may use predictions of the resource consumption to monetize the costs of running the equipment.

High level coordinator 112 may automatically determine (e.g., without human intervention) a combination of PBDR and/or IBDR programs in which to participate over the optimization period in order to maximize economic value. For example, high level coordinator 112 may consider the revenue generation potential of IBDR programs, the cost reduction potential of PBDR programs, and the equipment maintenance/replacement costs that would result from participating in various combinations of the IBDR programs and PBDR programs. High level coordinator 112 may weigh the benefits of participation against the costs of participation to determine an optimal combination of programs in which to participate. Advantageously, this allows high level coordinator 112 to determine an optimal set of control decisions that maximize the overall value of operating energy storage system 635.

In some instances, high level coordinator 112 may determine that it would be beneficial to participate in an IBDR program when the revenue generation potential is high and/or the costs of participating are low. For example, high level coordinator 112 may receive notice of a synchronous reserve event from an IBDR program which requires energy storage system 635 to shed a predetermined amount of power. High level coordinator 112 may determine that it is optimal to participate in the IBDR program if cold thermal energy storage 662 has enough capacity to provide cooling for buildings 116 while the load on chiller subplant 652 is reduced in order to shed the predetermined amount of power.

In other instances, high level coordinator 112 may determine that it would not be beneficial to participate in an IBDR program when the resources required to participate are better allocated elsewhere. For example, if buildings 116 is close to setting a new peak demand that would greatly increase the PBDR costs, high level coordinator 112 may determine that only a small portion of the electrical energy stored in electrical energy storage 663 will be sold to energy purchasers 648 in order to participate in a frequency response market. High level coordinator 112 may determine that the remainder of the electrical energy will be used to power chiller subplant 652 to prevent a new peak demand from being set.

In some embodiments, energy storage system 635 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Referring now to FIG. 6C, a block diagram illustrating control system 600 in greater detail is shown, according to an exemplary embodiment. Control system 600 is shown providing control decisions to a building management system (BMS) 678. In some embodiments, BMS 678 is the same or similar the BMS described with reference to FIG. 1. The control decisions provided to BMS 678 may include resource purchase amounts for utilities 640, setpoints for generator subplants 650, and/or charge/discharge rates for storage subplants 660.

BMS 678 may be configured to monitor conditions within a controlled building or building zone. For example, BMS 678 may receive input from various sensors (e.g., temperature sensors, humidity sensors, airflow sensors, voltage sensors, etc.) distributed throughout the building and may report building conditions to control system 600. Building conditions may include, for example, a temperature of the building or a zone of the building, a power consumption (e.g., electric load) of the building, a state of one or more actuators configured to affect a controlled state within the building, or other types of information relating to the controlled building. BMS 678 may operate subplants 650-660 to affect the monitored conditions within the building and to serve the thermal energy loads of the building.

BMS 678 may receive control signals from control system 600 specifying on/off states, charge/discharge rates, and/or setpoints for the subplant equipment. BMS 678 may control the equipment (e.g., via actuators, power relays, etc.) in accordance with the control signals provided by control system 600. For example, BMS 678 may operate the equipment using closed loop control to achieve the setpoints specified by control system 600. In various embodiments, BMS 678 may be combined with control system 600 or may be part of a separate building management system. According to an exemplary embodiment, BMS 678 is a METASYS® brand building management system, as sold by Johnson Controls, Inc.

Control system 600 may monitor the status of the controlled building using information received from BMS 678. Control system 600 may be configured to predict the thermal energy loads (e.g., heating loads, cooling loads, etc.) of the building for plurality of time steps in an optimization period (e.g., using weather forecasts from a weather service 601). Control system 600 may also predict the revenue generation potential of IBDR programs using an incentive event history (e.g., past clearing prices, mileage ratios, event probabilities, etc.) from incentive programs 602. Control system 600 may generate control decisions that optimize the economic value of operating energy storage system 635 over the duration of the optimization period subject to constraints on the optimization process (e.g., energy balance constraints, load satisfaction constraints, etc.). The optimization process performed by control system 600 is described in greater detail below.

According to an exemplary embodiment, control system 600 is integrated within a single computer (e.g., one server, one housing, etc.). In various other exemplary embodiments, control system 600 can be distributed across multiple servers or computers (e.g., that can exist in distributed locations). In another exemplary embodiment, control system 600 may integrated with a smart building manager that manages multiple building systems and/or combined with BMS 678.

Control system 600 is shown to include a communications interface 680 and a processing circuit 682. Communications interface 680 may include wired or wireless interfaces (e.g., jacks, antennas, transmitters, receivers, transceivers, wire terminals, etc.) for conducting data communications with various systems, devices, or networks. For example, communications interface 680 may include an Ethernet card and port for sending and receiving data via an Ethernet-based communications network and/or a Wi-Fi transceiver for communicating via a wireless communications network. Communications interface 680 may be configured to communicate via local area networks or wide area networks (e.g., the Internet, a building WAN, etc.) and may use a variety of communications protocols (e.g., BACnet, IP, LON, etc.).

Communications interface 680 may be a network interface configured to facilitate electronic data communications between control system 600 and various external systems or devices (e.g., BMS 678, subplants 650-660, utilities 640, etc.). For example, control system 600 may receive information from BMS 678 indicating one or more measured states of the controlled building (e.g., temperature, humidity, electric loads, etc.) and one or more states of subplants 650-660 (e.g., equipment status, power consumption, equipment availability, etc.). Communications interface 680 may receive inputs from BMS 678 and/or subplants 650-660 and may provide operating parameters (e.g., on/off decisions, setpoints, etc.) to subplants 650-660 via BMS 678. The operating parameters may cause subplants 650-660 to activate, deactivate, or adjust a setpoint for various devices thereof.

Still referring to FIG. 6C, processing circuit 682 is shown to include a processor 684 and memory 686. Processor 684 may be a general purpose or specific purpose processor, an application specific integrated circuit (ASIC), one or more field programmable gate arrays (FPGAs), a group of processing components, or other suitable processing components. Processor 684 may be configured to execute computer code or instructions stored in memory 686 or received from other computer readable media (e.g., CDROM, network storage, a remote server, etc.).

Memory 686 may include one or more devices (e.g., memory units, memory devices, storage devices, etc.) for storing data and/or computer code for completing and/or facilitating the various processes described in the present disclosure. Memory 686 may include random access memory (RAM), read-only memory (ROM), hard drive storage, temporary storage, non-volatile memory, flash memory, optical memory, or any other suitable memory for storing software objects and/or computer instructions. Memory 686 may include database components, object code components, script components, or any other type of information structure for supporting the various activities and information structures described in the present disclosure. Memory 686 may be communicably connected to processor 684 via processing circuit 682 and may include computer code for executing (e.g., by processor 684) one or more processes described herein.

Memory 686 is shown to include a building status monitor 672. Control system 600 may receive data regarding the overall building or building space to be heated or cooled by system 500 via building status monitor 672. In an exemplary embodiment, building status monitor 672 may include a graphical user interface component configured to provide graphical user interfaces to a user for selecting building requirements (e.g., overall temperature parameters, selecting schedules for the building, selecting different temperature levels for different building zones, etc.).

Control system 600 may determine on/off configurations and operating setpoints to satisfy the building requirements received from building status monitor 672. In some embodiments, building status monitor 672 receives, collects, stores, and/or transmits cooling load requirements, building temperature setpoints, occupancy data, weather data, energy data, schedule data, and other building parameters. In some embodiments, building status monitor 672 stores data regarding energy costs, such as pricing information available from utilities 640 (energy charge, demand charge, etc.).

Still referring to FIG. 6C, memory 686 is shown to include a load/rate predictor 622. Load/rate predictor 622 may be configured to predict the thermal energy loads ($\hat{\ell}_k$) of the building or campus for each time step k (e.g., k=1 . . . n) of an optimization period. Load/rate predictor 622 is shown receiving weather forecasts from a weather service 601. In some embodiments, load/rate predictor 622 predicts the thermal energy loads $\hat{\ell}_k$ as a function of the weather forecasts. In some embodiments, load/rate predictor 622 uses feedback from BMS 678 to predict loads $\hat{\ell}_k$. Feedback from BMS 678 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 678 (e.g., via building status monitor 672). Load/rate predictor 622 may predict loads $\hat{\ell}_k$ as a function of a given weather forecast ($\phi_w$), a day type (clay), the time of day (t), and previous measured load data ($Y_{k-1}$). Such a relationship is expressed in the following equation:

$$\hat{\ell}_k = f(\phi_w, \text{day}, t | Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict loads $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 640. Utility rates may indicate a cost or price per unit of a resource (e.g., electricity, natural gas, water, etc.) provided by utilities 640 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 640 or predicted utility rates estimated by load/rate predictor 622.

In some embodiments, the utility rates include demand charges for one or more resources provided by utilities 640. A demand charge may define a separate cost imposed by utilities 640 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 696 may be configured to account for demand charges in the high level optimization process performed by high level coordinator 112. Utilities 640 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 686 and/or provide the predicted loads $\hat{\ell}_k$ and the utility rates to demand response optimizer 696.

Still referring to FIG. 6C, memory 686 is shown to include an incentive estimator 670. Incentive estimator 670 may be configured to estimate the revenue generation potential of participating in various incentive-based demand response (IBDR) programs. In some embodiments, incentive estimator 670 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 670 may use the incentive event history to estimate IBDR event probabilities during the optimization period.

Incentive estimator 670 is shown providing incentive predictions to demand response optimizer 696. The incentive predictions may include the estimated IBDR probabilities, estimated participation requirements, an estimated amount of revenue from participating in the estimated IBDR events, and/or any other attributes of the predicted IBDR events. Demand response optimizer 696 may use the incentive predictions along with the predicted loads $\hat{\ell}_k$ and utility rates from load/rate predictor 622 to determine an optimal set of control decisions for each time step within the optimization period.

Still referring to FIG. 6C, memory 686 is shown to include a demand response optimizer 696. Demand response optimizer 696 may perform a cascaded optimization process to optimize the performance of energy storage system 635. For example, demand response optimizer 696 is shown to include a high level coordinator 112 and low level controllers 612-618. High level coordinator 112 may control an outer (e.g., subplant level) loop of the cascaded optimization. High level coordinator 112 may determine an optimal set of control decisions for each time step in the prediction window in order to optimize (e.g., maximize) the value of operating energy storage system 635. Control decisions made by high level coordinator 112 may include, for example, load setpoints for each of generator subplants 650, charge/discharge rates for each of storage subplants 660, resource purchase amounts for each type of resource purchased from utilities 640, and/or an amount of each resource sold to energy purchasers 648. In other words, the control decisions may define resource allocation at each time step. The control decisions made by high level coordinator 112 are based on the statistical estimates of incentive event probabilities and revenue generation potential for various IBDR events as well as the load and rate predictions.

Low level controllers 612-618 may control an inner (e.g., equipment level) loop of the cascaded optimization. Low level controllers 612-618 may determine how to best run each subplant at the load setpoint determined by high level coordinator 112. For example, low level controllers 612-618 may determine on/off states and/or operating setpoints for various devices of the subplant equipment in order to optimize (e.g., minimize) the energy consumption of each subplant while meeting the resource allocation setpoint for the subplant. In some embodiments, low level controllers 612-618 receives actual incentive events from incentive programs 602. Low level controllers 612-618 may determine whether to participate in the incentive events based on the resource allocation set by high level coordinator 112. For example, if insufficient resources have been allocated to a particular IBDR program by high level coordinator 112 or if the allocated resources have already been used, low level controllers 612-618 may determine that energy storage system 635 will not participate in the IBDR program and may ignore the IBDR event. However, if the required resources have been allocated to the IBDR program and are available in storage subplants 660, low level controllers 612-618 may determine that system 500 will participate in the IBDR program in response to the IBDR event. The cascaded optimization process performed by demand response optimizer 696 is described in greater detail in U.S. patent application Ser. No. 15/247,885.

Still referring to FIG. 6C, memory 686 is shown to include a subplant control module 676. Subplant control module 676 may store historical data regarding past operating statuses, past operating setpoints, and instructions for calculating and/or implementing control parameters for subplants 650-660. Subplant control module 676 may also receive, store, and/or transmit data regarding the conditions of individual devices of the subplant equipment, such as operating efficiency, equipment degradation, a date since last service, a lifespan parameter, a condition grade, or other device-specific data. Subplant control module 676 may receive data from subplants 650-660 and/or BMS 678 via communications interface 680. Subplant control module 676 may also receive and store on/off statuses and operating setpoints from low level controllers 612-618.

Data and processing results from demand response optimizer 696, subplant control module 676, or other modules of control system 600 may be accessed by (or pushed to) monitoring and reporting applications 674. Monitoring and reporting applications 674 may be configured to generate real time "system health" dashboards that can be viewed and navigated by a user (e.g., a system engineer). For example, monitoring and reporting applications 674 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6C, control system 600 may include one or more GUI servers, web services 688, or GUI engines 690 to support monitoring and reporting applications 674. In various embodiments, applications 674, web services 688, and GUI engine 690 may be provided as separate components outside of control system 600 (e.g., as part of a smart building manager). Control system 600 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Control system 600 may be configured to provide the results of any such processing to other databases, tables, XML files, or other data structures for further querying, calculation, or access by, for example, external monitoring and reporting applications.

Control system 600 is shown to include configuration tools 692. Configuration tools 692 can allow a user to define (e.g., via graphical user interfaces, via prompt-driven "wizards," etc.) how control system 600 should react to changing conditions in the energy storage subsystems. In an exemplary embodiment, configuration tools 692 allow a user to build and store condition-response scenarios that can cross multiple energy storage system devices, multiple building systems, and multiple enterprise control applications (e.g., work order management system applications, entity resource planning applications, etc.). For example, configuration tools 692 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 692 can present user interfaces for building such conditional logic. The user interfaces may allow users to define policies and responses graphically. In some embodiments, the user interfaces may allow a user to select a pre-stored or pre-constructed policy and adapt it or enable it for use with their system.

High Level Coordinator

Figure 7:
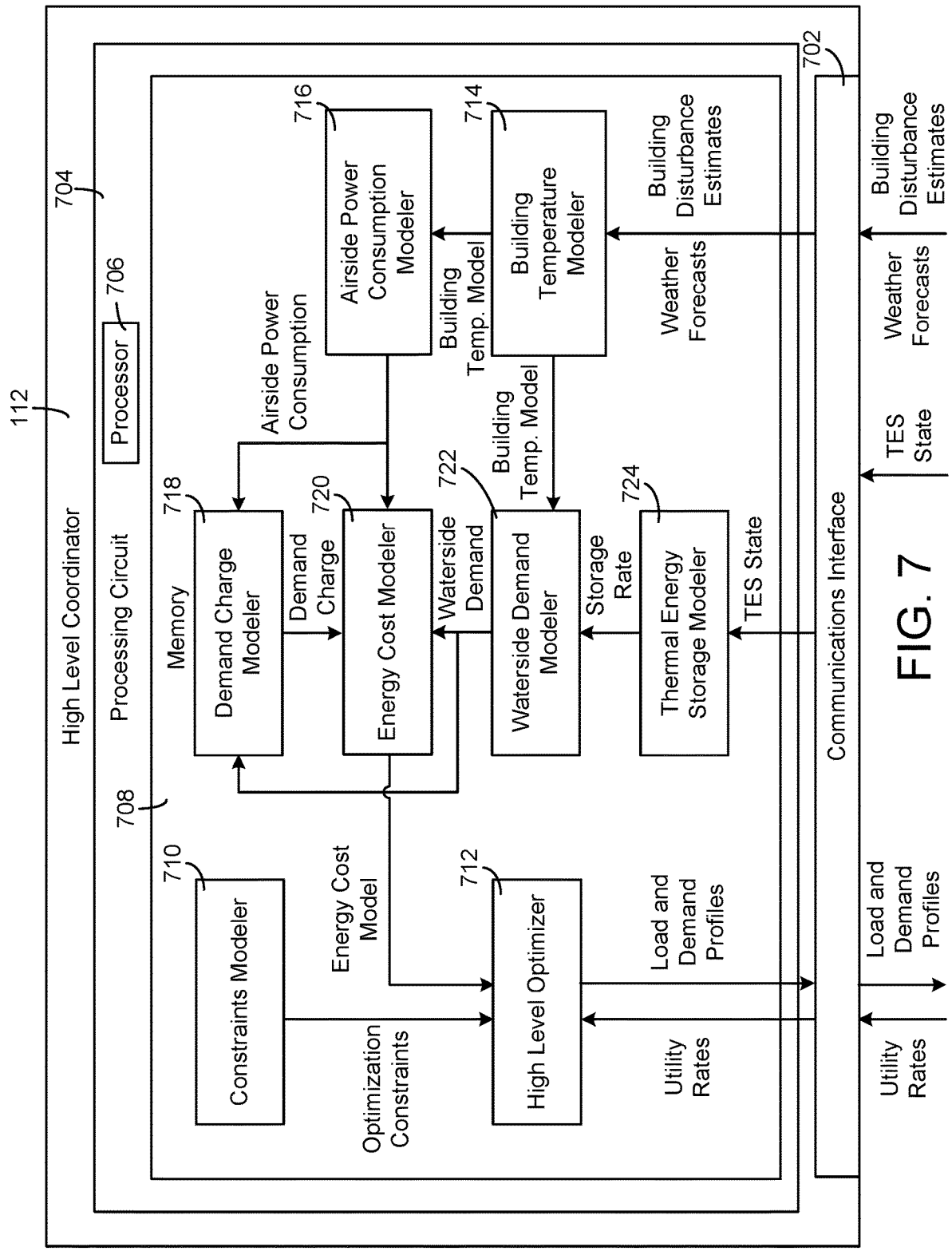
FIG. 7 is a block diagram illustrating the high level coordinator of FIG. 6A in greater detail, according to an exemplary embodiment.

Referring now to FIG. 7, a block diagram illustrating high level coordinator 112 in greater detail is shown, according to some embodiments. High level coordinator 112 is shown a communications interface 702 and a processing circuit 704. Communications interface 702 can include wired or wireless interfaces (e.g., jacks, antennas, transmitters, receivers, transceivers, wire terminals, etc.) for conducting data communications with various systems, devices, or networks. For example, communications interface 702 can include an Ethernet card and port for sending and receiving data via an Ethernet-based communications network and/or a WiFi transceiver for communicating via a wireless communications network. Communications interface 702 can be configured to communicate via local area networks or wide area networks (e.g., the Internet, a building WAN, etc.) and may use a variety of communications protocols (e.g., BACnet, IP, LON, etc.).

Communications interface 702 can be a network interface configured to facilitate electronic data communications between high level coordinator 112 and various external systems or devices (e.g., weather service 601, utilities 606, low level controllers 612-618, BMS equipment, etc.). For example, high level coordinator 112 can receive weather forecasts from weather service 601, utility rates from utilities 606, and/or load and rate predictions from load/rate predictor 622. High level coordinator 112 can receive measurements from the BMS indicating one or more measured states of the controlled building or campus (e.g., temperature, humidity, electric loads, etc.) and one or more states of central plant 118 (e.g., equipment status, power consumption, equipment availability, etc.). In some embodiments, high level coordinator 112 receives a measurement of the TES state from central plant 118, which indicates the current fill level of the TES tanks.

High level coordinator 112 can receive building disturbance estimates from each low level airside controller 612-614. The building disturbance estimates can indicate an estimated thermal energy load for each airside subsystem 632-634. High level coordinator 112 can receive aggregate system curves, aggregate building parameters, and/or coefficients of performance from each low level controller 612-618. High level coordinator 112 can use the information received at communications interface 702 to generate load profiles for each low level airside subsystem 632-634 and a demand profile for central plant 118. High level coordinator 112 can provide the load profiles and the demand profile to low level controllers 612-618.

Processing circuit 704 is shown to include a processor 706 and memory 708. Processor 706 can be a general purpose or specific purpose processor, an application specific integrated circuit (ASIC), one or more field programmable gate arrays (FPGAs), a group of processing components, or other suitable processing components. Processor 706 can be configured to execute computer code or instructions stored in memory 708 or received from other computer readable media (e.g., CDROM, network storage, a remote server, etc.).

Memory 708 can include one or more devices (e.g., memory units, memory devices, storage devices, etc.) for storing data and/or computer code for completing and/or facilitating the various processes described in the present disclosure. Memory 708 can include random access memory (RAM), read-only memory (ROM), hard drive storage, temporary storage, non-volatile memory, flash memory, optical memory, or any other suitable memory for storing software objects and/or computer instructions. Memory 708 can include database components, object code components, script components, or any other type of information structure for supporting the various activities and information structures described in the present disclosure. Memory 708 can be communicably connected to processor 706 via processing circuit 704 and can include computer code for executing (e.g., by processor 706) one or more processes described herein. When processor 706 executes instructions stored in memory 708, processor 706 generally configures high level coordinator 112 (and more particularly processing circuit 704) to complete such activities.

Still referring to FIG. 7, high level coordinator 112 is shown to include a building temperature modeler 714. Building temperature modeler 714 can generate a temperature model for each airside subsystem 632-634. The temperature models generated by building temperature modeler 714 are referred to as building temperature models under the assumption that each airside subsystem 632-634 represents a separate building. However, the temperature models generated by building temperature modeler 714 can be temperature models for other types of subsystems if airside subsystems 632-634 represent other types of spaces. Building temperature modeler 714 can generate a temperature model for each building. Although only two airside subsystems 632-634 are shown in FIG. 6A, it should be understood that any number of buildings and airside subsystems 632-634 may be present. In general, building temperature modeler 714 can generate $n_b$ building temperature models, where $n_b$ is the total number of buildings and/or airside subsystems 632-634.

In some embodiments, building temperature modeler 714 models the temperature of each building using a building heat transfer model. The dynamics of heating or cooling a single building zone are described by the energy balance:

$$C\frac{dT}{dt} = -H(T - T_a) - \dot{Q}_c + \dot{Q}_{other}$$

where C is the thermal capacitance of the building zone, H is the ambient heat transfer coefficient for the building zone, T is the temperature of the building zone, $T_a$ is the ambient temperature outside the building zone (e.g., the outside air temperature), $\dot{Q}_c$ is the amount of cooling applied to the building zone (i.e., the cooling load), and $\dot{Q}_{other}$ is the external load, radiation, or other disturbance experienced by the building zone. In the previous equation, $\dot{Q}_c$ represents heat transfer out of the building zone (i.e., cooling) by the HVAC system and therefore has a negative sign. However, if heating is applied to the building zone rather than cooling, the sign on $\dot{Q}_c$ can be switched to a positive sign such that $\dot{Q}_c$ represents the amount of heating applied to the building zone by the HVAC system (i.e., the heating load).

The previous equation combines all mass and air properties of the building zone into a single zone temperature. Other heat transfer models which can be used by building temperature modeler 714 include the following air and mass zone models:

$$C_z\frac{dT_z}{dt} = H_{az}(T_a - T_z) + H_{mz}(T_m - T_z) - \dot{Q}_c + \dot{Q}_{other}$$

$$C_m\frac{dT_m}{dt} = H_{mz}(T_z - T_m)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by building temperature modeler 714 include the following air, shallow mass, and deep mass zone models:

$$C_z \frac{dT_z}{dt} = H_{az}(T_a - T_z) + H_{sz}(T_s - T_z) - \dot{Q}_c + \dot{Q}_{other}$$

$$C_s \frac{dT_s}{dt} = H_{sz}(T_z - T_s) + H_{ds}(T_d - T_s)$$

$$C_d \frac{dT_d}{dt} = H_{ds}(T_s - T_d)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, building temperature modeler 714 models the temperature of each building using the following building temperature model:

$$C_b \frac{dT_b}{dt} = -H_b(T_b - T_a) - \dot{Q}_{c,b} + \dot{Q}_{other,b}$$

where $C_b$ and $T_b$ are the thermal capacitance and temperature of the building designated by building index b, $T_a$ is the ambient air temperature outside building b (e.g., outside air temperature), $H_b$ is the heat transfer coefficient between building b and the ambient air, $\dot{Q}_{c,b}$ is the amount of cooling applied to the building by Control system 600 (i.e., the amount of heat removed from the building), and $\dot{Q}_{other,b}$ is the external load, radiation, or disturbance experienced by building b. If heating is provided to the building rather than cooling, the sign on $\dot{Q}_{c,b}$ can be switched from a negative sign to a positive sign.

Building temperature modeler 714 can use the building disturbance estimates received from low level airside controllers 612-614 to identify appropriate values of the external disturbance $\dot{Q}_{other,b}$ for each building b at each time step of the optimization period. In some embodiments, building temperature modeler 714 uses the weather forecasts from weather service 601 and/or the load and rate predictions provided by load/rate predictor 622 to determine appropriate values for the ambient air temperature $T_a$ and/or the external disturbance $\dot{Q}_{other,b}$ for each building b at each time step of the optimization period. Values of $C_b$ and $H_b$ can be specified as parameters of the building b, received from the low level airside controller for the building b, received from a user, retrieved from memory 708, or otherwise provided to building temperature modeler 714. Building temperature modeler 714 can generate a building temperature model for each building b, where b=1 ... $n_b$ and $n_b$ is the total number of buildings.

Still referring to FIG. 7, high level coordinator 112 is shown to include a thermal energy storage (TES) modeler 724. TES modeler 724 can generate a model for the active thermal energy storage provided by TES tanks 42 and 40. In some embodiments, TES modeler 724 uses the following equation to model the active thermal energy storage:

$$\frac{ds}{dt} = -\sigma s + \dot{Q}_{storage}$$

where s is the amount of thermal energy (e.g., heating or cooling potential) stored in a given TES tank, $\sigma$ is the decay constant for the TES tank, and $\dot{Q}_{storage}$ is the rate at which thermal energy is stored in the TES tank. TES modeler 724 can generate an active TES model for each TES tank.

High level coordinator 112 is shown to include a waterside demand modeler 722. Waterside demand modeler 722 can generate a model representing the demand on central plant 118 as a function of the thermal energy load $\dot{Q}_{c,b}$ allocated to each building b and the amount of thermal energy storage $\dot{Q}_{storage}$ at each time step of the optimization period. In some embodiments, waterside demand modeler 722 uses the following equation to model waterside demand:

$$\dot{Q}_{HVAC,k} = \sum_{b=1}^{b_n} \dot{Q}_{c,b,k} + \dot{Q}_{storage,k}$$

where $\dot{Q}_{HVAC,k}$ is the waterside demand at time step k (e.g., the thermal energy production of central plant 118 at time step k), $\dot{Q}_{c,b,k}$ is the thermal energy load allocated to building b at time step k, and $\dot{Q}_{storage,k}$ is the amount of thermal energy being stored in the TES tanks during time step k. The previous equation indicates that the total demand $\dot{Q}_{HVAC,k}$ on the central plant 118 is a summation of the thermal energy loads $\dot{Q}_{c,b,k}$ allocated to each building b and the thermal energy $\dot{Q}_{storage,k}$ being stored in the TES tanks. This equation can be used by high level coordinator 112 as an energy balance constraint to ensure that central plant 118 generates enough thermal energy to cover the building loads and the thermal energy storage at each time step k.

High level coordinator 112 is shown to include a constraints modeler 710. Constraints modeler 710 can generate and impose optimization constraints on the optimization procedure performed by high level optimizer 712. Constraints imposed by constraints modeler 710 can include, for example, equipment capacity constraints and building temperature constraints. In some embodiments, constraints modeler 710 imposes the following constraint:

$$\dot{Q}_{HVAC,k} \leq \dot{Q}_{HVAC,max}$$

to ensure that the waterside demand $\dot{Q}_{HVAC,k}$ at each time step k is less than or equal to the maximum capacity $\dot{Q}_{HVAC,max}$ of central plant 118. Similarly, constraints modeler 710 can impose the following constraint:

$$0 \leq s_k \leq s_{max}$$

to ensure that the amount of thermal energy stored in the TES tanks at any time step k is between the minimum possible level of the TES tanks (i.e., zero) and the maximum possible level of the TES tanks (i.e., $s_{max}$).

In some embodiments, constraints modeler 710 imposes constraints on the building temperature $T_b$. For example, constraints modeler 710 can constrain the building temperature $T_b$ between a minimum temperature $T_{min}$ and a maximum temperature $T_{max}$ as shown in the following equation:

$$T_{min} \leq T_b \leq T_{max}$$

where the values of $T_{min}$ and $T_{max}$ can be adjusted based on the temperature setpoints of the building. In some embodiments, constraints modeler 710 automatically adjusts the values of $T_{min}$ and $T_{max}$ based on information received from the low level airside controller and/or BMS for the building. For example, constraints modeler 710 can use a temperature setpoint schedule and/or occupancy schedule for the building to automatically adjust the values of $T_{min}$ and $T_{max}$ for each time step k. This allows constraints modeler 710 to use temperature limits based on the time-varying setpoint temperature range for the building so that the building temperature $T_b$ is maintained within time-appropriate temperature limits $T_{min}$ and $T_{max}$.

Still referring to FIG. 7, high level coordinator 112 is shown to include an energy cost modeler 720 and a demand charge modeler 718. Energy cost modeler 720 can generate an energy cost model representing the cost of energy consumed by control system 600. The cost of energy can include both a per-unit cost of energy resources (e.g., electricity, water, natural gas, etc.) consumed by control system 600 during the optimization period and a demand charge based on the maximum power consumption. The demand charge component of the energy cost model can be modeled by demand charge modeler 718 and enforced via demand charge constraints. In some embodiments, the energy cost model accounts for only the energy resources consumed by central plant 118. In other embodiments, the energy cost model also accounts for the power consumption of buildings 116, which can be modeled by airside power consumption modeler 716. Examples of both scenarios are described below.

Example 1: Energy Cost Model without Airside Power Consumption

In some embodiments, energy cost modeler 720 generates an energy cost model that accounts for the energy consumption of central plant 118 without including airside power consumption. For example, energy cost modeler 720 can model total energy cost during the optimization period using the following equation:

$$\sum_{k=0}^{N-1} c_k \eta_{tot} \dot{Q}_{HVAC,k} \Delta + c_{peak} \eta_{tot} \dot{Q}_{peak}$$

The first term of the energy cost model accounts for the per unit costs (e.g., $/kWh) of energy consumed during each time step k of the optimization period. In some embodiments, $c_k$ is the cost per unit of energy consumed at time step k to satisfy the total waterside demand $\dot{Q}_{HVAC,k}$ at time step k, the parameter $\eta_{tot}$ is the inverse of the coefficient of performance of the aggregate airside/waterside system (e.g., $0.1 \leq \eta_{tot} \leq 0.25$), and $\Delta$ is the duration of time step k. Accordingly, the term $\eta_{tot} \dot{Q}_{HVAC,k} \Delta$ represents the total amount of energy consumed (e.g., kWh) during time step k to satisfy the waterside demand $\dot{Q}_{HVAC,k}$. Multiplying by the cost $c_k$ per unit energy consumed (e.g., $/kWh) yields the total cost (e.g., $) of the energy consumed during time step k. The energy cost model can include a summation of the energy costs during each time step k to determine the total cost of energy consumption over the optimization period.

The second term of the energy cost model accounts for the demand charge. In some embodiments, $c_p$ is the demand charge rate (e.g., $/kW), $\dot{Q}_{peak}$ is the peak waterside demand during the demand charge period (e.g., the maximum of $\dot{Q}_{HVAC,k}$), and $\eta_{tot}$ is the inverse of the coefficient of performance of the aggregate airside/waterside system. Accordingly, the term $\eta_{tot} \dot{Q}_{peak}$ represents the peak power consumption to satisfy the peak waterside demand $\dot{Q}_{peak}$. Multiplying by the demand charge rate $c_{peak}$ yields the total cost (e.g., $) of the demand charge.

In some embodiments, demand charge modeler 718 generates demand charge constraints to ensure that $\dot{Q}_{peak}$ has the appropriate value. If the demand charge period is contained entirely within the optimization period (e.g., between time steps k=0 and k=N−1), then the appropriate value of $\dot{Q}_{peak}$ is simply the maximum of $\dot{Q}_{HVAC,k}$ during the optimization period. Demand charge modeler 718 can implement the following demand charge constraint:

$$0 \leq \dot{Q}_{HVAC,k} \leq \dot{Q}_{peak}$$

to ensure that the peak waterside demand $\dot{Q}_{peak}$ is always greater than or equal to the waterside demand $\dot{Q}_{HVAC,k}$ at each time step. This forces the peak waterside demand $\dot{Q}_{peak}$ to be at least as large as the maximum waterside demand during the optimization period.

If the demand charge period begins before the optimization period, it is possible that the maximum value of $\dot{Q}_{HVAC,k}$ during the demand charge period occurred prior to the beginning of the optimization period. Demand charge modeler 718 can implement the following demand charge constraint:

$$\dot{Q}_{peak,past} \leq \dot{Q}_{peak}$$

to ensure that the peak waterside demand $\dot{Q}_{peak}$ is always greater than or equal to the maximum waterside demand $\dot{Q}_{peak,past}$ that occurred during the same demand charge period, even if the maximum waterside demand occurred prior to the beginning of the current optimization period. In some embodiments, demand charge modeler 718 updates $\dot{Q}_{peak,past}$ each time a new maximum waterside demand is set to ensure that the energy cost model accurately represents the demand charge imposed by the power utility.

High level optimizer 712 can use the energy cost model, demand charge model, building temperature model, thermal energy storage model, waterside demand model, and optimization constraints to formulate an optimization problem. In some embodiments, high level optimizer 712 seeks to minimize the total cost of energy consumed by central plant 118 (i.e., energy cost and demand charge) subject to the building temperature constraints and other constraints provided by the high level models described herein. For example, high level optimizer 712 can formulate the high level optimization problem as:

$$\min_{x, u, \dot{Q}_{peak}} \sum_{k=0}^{N-1} c_k \eta_{tot} \dot{Q}_{HVAC,k} \Delta + c_{peak} \eta_{tot} \dot{Q}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \leq \dot{Q}_{HVAC,k} \leq \dot{Q}_{peak}$$

$$\dot{Q}_{peak,past} \leq \dot{Q}_{peak} \leq \dot{Q}_{HVAC,max}$$

$$0 \leq s_k \leq s_{max}$$

$$T_{min} \leq T_b \leq T_{max}$$

In some embodiments, high level optimizer 712 converts one or more of the above-identified models and/or constraints to state-space form for use in the high level optimization problem. For example, high level optimizer 712 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+i}$ is a vector of (predicted) system states at time k+1. Table 1 illustrates the variables that can be included in each of these vectors:

TABLE 1

| Variables in High level Optimization | | |
|---|---|---|
| States | $x = [T_b \ s]^T$ | $n = n_b + 1$ |
| Inputs | $u = [\dot{Q}_{c,b} \ \dot{Q}_{storage}]^T$ | $m = n_b + 1$ |
| Measurements | $y = [T_b \ s]^T$ | $p = n_b + 1$ |
| Disturbances | $d = [T_a \ \dot{Q}_{other,b}]^T$ | $n_d = n_b + 1$ |

As shown in Table 1, the system states vector x includes the building temperature $T_b$ and the TES storage level s. In some embodiments, the system states vector x includes a building temperature $T_b$ for each of the $n_b$ buildings and a TES storage level s such that the total number n of variables in the system states vector x is equal to $n_b+1$. The inputs vector u can include the thermal energy load $\dot{Q}_{c,b}$ allocated to each building b and the thermal energy load $\dot{Q}_{storage}$ allocated to thermal energy storage. In some embodiments, the inputs vector u includes a thermal energy load $\dot{Q}_{c,b}$ for each of the $n_b$ buildings and a TES load 6 storage such that the total number m of variables in the inputs vector u is equal to $n_b+1$. The disturbance vector d can include the ambient air temperature $T_a$ and the estimated disturbance $\dot{Q}_{other,b}$ for each building. In some embodiments, the disturbances vector d includes an estimated disturbance $\dot{Q}_{other,b}$ for each of the $n_b$ buildings and a single ambient air temperature $T_a$ such that the total number $n_d$ of variables in the disturbances vector d is equal to $n_b+1$.

In some embodiments, the measurements vector y is the same as the system states vector x. This indicates that all of the system states are directly measured (i.e., $y_k=x_k$) and the values of the C and D matrices in the state-space model are C=I and D=0. In other embodiments, the system states x can be constructed or predicted from the measurements y. For example, high level coordinator 112 can use a Kalman filter or other predictive technique to construct the system states x from the measurements y. Accordingly, the system states x can be replaced with $\hat{T}_b$ and $\hat{s}$, where the hat notation indicates that such states are predicted. The values of the A, B, C, and D, matrices in the state-space representation can be identified using a system identification technique. Examples of state prediction and system identification techniques which can be used by high level coordinator 112 are described in detail in U.S. Pat. No. 9,235,657 titled "System Identification and Model Development" and filed Mar. 13, 2013, the entire disclosure of which is incorporated by reference herein.

Example 2: Energy Cost Model with Airside Power Consumption

In some embodiments, energy cost modeler 720 generates an energy cost model that accounts for both the energy consumption of central plant 118 and the energy consumption of the airside systems within buildings 116. For example, the energy cost model can account for the power $\dot{W}_{air,b}$ consumed by fans and other types of airside equipment 622 to deliver the allocated thermal energy load $\dot{Q}_{c,b}$ to the building. In some embodiments, the power consumption $\dot{W}_{air,b}$ of each airside subsystem 632-634 is a function of the thermal energy load $\dot{Q}_{c,b}$ allocated to that airside subsystem.

Airside power consumption modeler 716 can generate an airside power consumption model which relates airside power consumption $\dot{W}_{air,b}$ to thermal energy load $\dot{Q}_{c,b}$. In some embodiments, airside power consumption modeler 716 models airside power consumption using the following equation:

$$\dot{W}_{air,b} = \eta_{air} \dot{Q}_{c,b}$$

where $\dot{W}_{air,b}$ is the amount of power consumed by the airside equipment 622 of building b to deliver the thermal energy load $\dot{Q}_{c,b}$. The conversion factor $\eta_{air}$ can be a function of the coefficient of performance of the airside equipment 622 (e.g., an inverse of the coefficient of performance). In some embodiments, $\eta_{air}$ is a constant, which indicates that the relationship between airside power consumption $\dot{W}_{air,b}$ and thermal energy load $\dot{Q}_{c,b}$ is linear. In other embodiments, $\eta_{air}$ can be calculated by airside power consumption modeler 716 as a nonlinear function of load and other parameters using operating data.

In some embodiments, airside power consumption modeler 716 calculates the conversion factor $\eta_{air}$ as a function of various airside system parameters such as the type of AHUs, the time of day, comfort bounds, ambient conditions, chilled water supply temperature, chilled water supply flow rate, and/or other parameters that characterize buildings 116 or any of the airside subsystems 632-634. For example, airside power consumption modeler 716 can collect operating data from airside equipment 622 and/or low level airside controller 612 and use the operating data to determine an appropriate value of $\eta_{air}$.

In some embodiments, airside power consumption modeler 716 calculates $\eta_{air}$ as a function of the thermal energy load $\dot{Q}_c$ and individual fan power models. For example, air at 20° C. can have a density $\rho_{air}$ and heat capacity $C_{p,air}$ as shown in the following equations:

$$\rho_{air} = 1.205 \frac{kg}{m^3}$$

$$C_{p,air} = 1.005 \frac{kJ}{kg \cdot K}$$

The thermal energy load $\dot{Q}_c$ provided by an airflow can be represented using the following model:

$$\dot{Q}_c = \dot{m}_{air} C_{p,air} \Delta T$$

$$\dot{Q}_c = \rho_{air} \dot{V}_{air} C_{p,air} (T_{room} - T_{supply})$$

$$\frac{\dot{Q}_c}{\dot{V}_{air}} = \rho_{air} C_{p,air} (T_{room} - T_{supply})$$

where $\dot{V}_{air}$ is the volumetric flow rate of supply air into a building zone, $T_{room}$ is the temperature of the building zone, and $T_{supply}$ is the temperature of the supply air. Assuming that the supply air temperature $T_{supply}$ is approximately 55° F. and the room air temperature $T_{room}$ is approximately 72° F., airside power consumption modeler 716 can calculate the thermal energy load per unit volume of airflow (e.g., the cooling capacity of the air) as follows:

$$\frac{\dot{Q}_c}{\dot{V}_{air}} = \left(1.205 \frac{kg}{m^3}\right)\left(1.005 \frac{kJ}{kg \cdot K}\right)(72° F. - 55° F.)\left(\frac{5 K}{9° F.}\right)$$

$$\frac{\dot{Q}_c}{\dot{V}_{air}} = 11.437 \frac{kJ}{m^3}$$

Airside power consumption modeler 714 can use this value of cooling capacity $\dot{Q}_c/\dot{V}_{air}$ and the estimated power consumption per unit volume of a typical airside fan to estimate the value of $\eta_{air}$. For example, typical HVAC fans consume approximately 1 horsepower (hp) to provide between 1000 cubic feet per minute (CFM) and 1500 CFM of airflow. These values can be converted to metric values as follows:

$$\left(\frac{1 \text{ hp}}{1000 \text{ CFM} - 1500 \text{ CFM}}\right)\left(\frac{2118.9 \text{ CFM}}{1 \text{ m}^3/\text{s}}\right)\left(\frac{0.7457 \text{ kW}}{\text{hp}}\right) =$$

$$1.05 \frac{kJ}{m^3} - 1.58 \frac{kJ}{m^3}$$

Substituting these values into the airside power consumption model yields:

$$\frac{\dot{W}_{air}}{\dot{V}_{air}} = \eta_{air} \frac{\dot{Q}_c}{\dot{V}_{air}}$$

$$1.05 \frac{kJ}{m^3} - 1.58 \frac{kJ}{m^3} = \eta_{air} 11.437 \frac{kJ}{m^3}$$

$$\eta_{air} = 0.091 - 0.14$$

which indicates that the airside power consumption $\dot{W}_{air,b}$ of each airside subsystem 622-624 is approximately 10% of the thermal energy load $\dot{Q}_{c,b}$ delivered by the airside subsystem.

Given that airside power consumption $\dot{W}_{air,b}$ can be modeled as $\eta_{air} \dot{Q}_{c,b}$, energy cost modeler 720 can model total energy cost during the optimization period using the following equation:

$$\sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

The first portion of the energy cost model accounts for the per unit costs (e.g., $/kWh) of energy consumed by central plant 118 during each time step k of the optimization period. In some embodiments, $c_k$ is the cost per unit of energy consumed at time step k, $\Delta$ is the duration of time step k, and $\eta_{HVAC}$ is the inverse of the coefficient of performance of central plant 118 (e.g., $\eta_{HVAC}$~0.2). The term $\eta_{HVAC} \dot{Q}_{HVAC,k}$ represents the amount of power consumption (e.g., kW) by central plant 118 during time step k to satisfy the waterside demand $\dot{Q}_{HVAC,k}$. Multiplying by the cost $c_k$ per unit energy consumed (e.g., $/kWh) and the duration $\Delta$ (e.g., hours) yields the total cost (e.g., $) of the energy consumed during time step k by central plant 118. The first portion of the energy cost model can be summed across all time steps k=0 ... N-1 of the optimization period to determine the total energy consumed by central plant 118 over the duration of the optimization period.

The second portion of the energy cost model accounts for the per unit costs (e.g., $/kWh) of energy consumed by each airside subsystem (e.g., each building b) during each time step k of the optimization period. As described above, $\eta_{air}$ is the inverse of the coefficient of performance of the airside subsystems (e.g., $\eta_{air}$~0.1) and $\dot{Q}_{c,b,k}$ is the thermal energy load delivered by the airside subsystem for building b at time step k. The term $\eta_{air} \dot{Q}_{c,b,k}$ represents the power consumption $\dot{W}_{air,b}$ of the airside equipment for building b. The second portion of the energy cost model can be summed across all buildings b=1 ... $n_b$ and across all time steps k=0 ... N-1 to determine the total power consumption of all airside subsystems over the duration of the optimization period. Multiplying by the cost $c_k$ per unit energy consumed (e.g., $/kWh) and the duration $\Delta$ (e.g., hours) yields the total cost (e.g., $) of the energy consumed by the airside subsystems over the duration of the optimization period.

The third portion of the energy cost model accounts for the demand charge. In some embodiments, $c_{peak}$ is the demand charge rate (e.g., $/kW) and $\dot{W}_{peak}$ is the peak aggregate airside and waterside power consumption during the applicable demand charge period. Multiplying by the demand charge rate $c_{peak}$ yields the total cost (e.g., $) of the demand charge. In some embodiments, demand charge modeler 718 generates demand charge constraints to ensure that $\dot{W}_{peak}$ has the appropriate value. If the demand charge period is contained entirely within the optimization period (e.g., between time steps k=0 and k=N-1), then the appropriate value of $\dot{W}_{peak}$ is the maximum of the combined waterside/airside power consumption at any time step k during the optimization period. Demand charge modeler 718 can implement the following demand charge constraint:

$$0 \leq \left( \eta_{HVAC} \dot{Q}_{HVAC,k} + \eta_{air} \sum_{b=1}^{n_b} \dot{Q}_{c,b,k} \right) \leq \dot{W}_{peak}$$

to ensure that the peak power consumption $\dot{W}_{peak}$ is always greater than or equal to the sum of the waterside power consumption $\eta_{HVAC} \dot{Q}_{HVAC,k}$ and the airside power consumption $\eta_{air} \sum_{b=1}^{n_b} \dot{Q}_{c,b,k}$ at each time step. This forces the peak power consumption $\dot{W}_{peak}$ to be at least as large as the maximum combined airside/waterside demand during the optimization period.

If the demand charge period begins before the optimization period, it is possible that the maximum peak power consumption during the demand charge period occurred prior to the beginning of the optimization period. Demand charge modeler 718 can implement the following demand charge constraint:

$$\dot{W}_{peak,past} \leq \dot{W}_{peak}$$

to ensure that the peak power consumption $\dot{W}_{peak}$ is always greater than or equal to the maximum power consumption $\dot{W}_{peak,past}$ that occurred during the same demand charge period, even if the maximum power consumption occurred prior to the beginning of the current optimization period. In some embodiments, demand charge modeler 718 updates $\dot{W}_{peak,past}$ each time a new maximum power consumption is set to ensure that the energy cost model accurately represents the demand charge imposed by the power utility.

High level optimizer 712 can use the energy cost model, airside power consumption model, demand charge model, building temperature model, thermal energy storage model, waterside demand model, and optimization constraints to formulate an optimization problem. In some embodiments, high level optimizer 712 seeks to minimize the total cost of energy consumed by the aggregate airside/waterside system subject to the building temperature constraints and other constraints provided by the high level models described herein. For example, high level optimizer 712 can formulate the high level optimization problem as:

$$\min_{x,u,\dot{W}_{peak}} \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \leq \left( \eta_{HVAC} \dot{Q}_{HVAC,k} + \eta_{air} \sum_{b=1}^{n_b} \dot{Q}_{c,b,k} \right) \leq \dot{W}_{peak}$$

$$\dot{W}_{peak,past} \leq \dot{W}_{peak}$$

$$0 \leq \dot{Q}_{HVAC,k} \leq \dot{Q}_{HVAC,max}$$

$$0 \leq s_k \leq s_{max}$$

$$T_{min} \leq T_b \leq T_{max}$$

In some embodiments, high level optimizer 712 converts one or more of the above-identified models and/or constraints to state-space form for use in the high level optimization problem. For example, high level optimizer 712 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. The variables included in each vector can be the same as shown in Table 1 above.

High level optimizer 712 can perform an optimization procedure to determine optimal values for each the input variables in the vector u at each time step k of the optimization period. For example, high level optimizer 712 can determine optimal values for each of the thermal energy loads $\dot{Q}_{c,b,k}$ allocated to each building b at each time step k and the thermal energy load $\dot{Q}_{storage,k}$ allocated to thermal energy storage at each time step k. Each set of thermal energy loads $\dot{Q}_{c,b,k}$ with the same building index b forms a load profile for a particular airside subsystem and includes a load value for each time step k in the optimization period. Similarly, the set of TES loads $\dot{Q}_{storage,k}$ forms a load profile for the TES tanks and includes a load value for each time step k in the optimization period. High level optimizer 712 can provide the airside subsystem load profiles to the low level airside controllers 612-614 and can provide the TES load profile to the central plant controller 618.

In some embodiments, high level optimizer 712 generates a vector of predicted temperature states $\hat{T}_b$ for each low level airside subsystem 632-634. Each vector of predicted temperature states $\hat{T}_b$ can include a predicted building temperature state $\hat{T}_{b,k}$ for each time step k during the optimization period. Temperature states $\hat{T}_{b,k}$ can be predicted using any of a variety of predictive techniques including, for example, a Kalman filter as described in U.S. Pat. No. 9,235,657. High level optimizer 712 can provide each vector of predicted temperature states $\hat{T}_b$ to the low level airside controller 612-614 for the corresponding low level airside subsystem 632-634. In some embodiments, low level airside controllers 612-614 use the predicted temperature states $\hat{T}_b$ to generate zone temperature setpoints that track the predicted temperature states $\hat{T}_{b,k}$ at each time step k.

In some embodiments, high level optimizer 712 calculates the total demand $\dot{Q}_{HVAC,k}$ on central plant 118 at each time step k as a summation of the building thermal energy loads $\dot{Q}_{c,b,k}$ and the TES load $\dot{Q}_{storage,k}$ at time step k. The set of waterside demand values forms a demand profile for central plant 118 and includes a demand value for each time step k in the optimization period. The demand value $\dot{Q}_{HVAC,k}$ for a particular time step k represents the total demand which must be satisfied by central plant 118 at that time step k. High level optimizer 712 can provide the waterside demand profile to central plant controller 618.

Referring now to FIG. 9, a block diagram illustrating high level optimizer 632 in greater detail is shown, according to an exemplary embodiment. In some embodiments, high level optimizer 632 may be implemented as a component of energy storage controller 506, as described with reference to FIGS. 5A and 6A. In other embodiments, high level optimizer 632 may be implemented as a component of controller 552, as described with reference to FIGS. 5B and 6B. In other embodiments, high level optimizer 632 may be implemented as a component of planning tool 702, as described with reference to FIGS. 7-8.

High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520 an amount of each resource stored or withdrawn from storage supplants 530, and/or an amount of each resource sold to energy purchasers 648. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from peak load contribution charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire simulation period (e.g., an entire year), as described with reference to FIG. 8. The optimization process can be expanded to include economic load demand response (ELDR) and can account for peak load contribution charges. High level optimizer 632 can allocate the battery asset at each time step (e.g., each hour) over a given horizon such that energy and demand costs are minimized and frequency regulation (FR) revenue maximized. These and other features of high level optimizer 632 are described in detail below.

Example 3: Objective Function with Incentive Program Revenue

In some embodiments, energy cost modeler 720 generates a cost function or objective function which represents the total operating cost control system 100, control system 600, energy storage system 635, or any other system in which high level coordinator 112 is implemented. In some embodiments, the cost function can be expressed generically using the following equation:

$$\arg\min_x J(x)$$

where J(x) is defined as follows:

$$J(x) = \sum_{sources}\sum_{horizon} \text{cost}(purchase_{resource,time}, time) - \sum_{incentives}\sum_{horizon} \text{revenue}(ReservationAmount)$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

High level coordinator 112 can optimize the cost function J(x) subject to the following constraint, which guarantees the balance between resources purchased, produced, discharged, consumed, and requested over the optimization horizon:

$$\sum_{sources} purchase_{resource,time} + \sum_{subplants} \text{produces}(x_{internal,time}, x_{external,time}, v_{uncontrolled,time}) - \sum_{subplants} \text{consumes}(x_{internal,time}, x_{external,time}, v_{uncontrolled,time}) + \sum_{storages} \text{discharges}_{resources}(x_{internal,time}, x_{external,time}) - \sum_{sinks} requests_{resource} = 0$$

$\forall$ resources, $\forall$ time $\in$ horizon where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 640) over the optimization horizon. The second term represents the total consumption of each resource within the system (e.g., by generator subplants 650) over the optimization horizon. The third term represents the total amount of each resource discharged from storage (e.g., storage subplants 660) over the optimization horizon. Positive values indicate that the resource is discharged from storage, whereas negative values indicate that the resource is charged or stored. The fourth term represents the total amount of each resource requested by various resource sinks (e.g., buildings 116, energy purchasers 648, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, high level coordinator 112 separates the purchase cost of one or more resources into multiple terms. For example, high level coordinator 112 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). High level coordinator 112 can express the cost function using the following equation:

$$J(x) = \sum_{s\in sources}\left[\sum_{q\in demands_s} w_{demand,s,q} r_{demand,s,q} \max_{i\in demands_{s,q}}(purchase_{s,i}) + \sum_{horizon} r_{s,i} purchase_{s,i}\right] - \sum_{incentives}\sum_{horizon} \text{revenue}(ReservationAmount)$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable purchase indicates the amount of the resource purchased from source s during the ith time step of the optimization period.

In some embodiments, the energy system in which high level coordinator 112 is implemented includes a battery asset (e.g., one or more batteries) configured to store and discharge electricity. If the battery asset is the only type of energy storage, high level coordinator 112 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} |P_{bat_i} - P_{bat_{i-1}}| + w_d r_d \max_i(-P_{bat_i} + eLoad_i)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., $/kWh) at time step i, $P_{FR,i}$ is the battery power (e.g., kW) committed to frequency regulation participation during time step i, $r_{FR_i}$ is the incentive rate (e.g., $/kWh) for participating in frequency regulation during time step i, $r_d$ is the applicable demand charge (e.g., $/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

High level coordinator 112 can optimize the cost function J(x) subject to a set of constraints. The constraints may include capacity constraints, equipment load constraints, maximum charge/discharge rate constraints, operational domain constraints, or other constraints that define the limits at which the equipment can operate. The constraints may also include constraints on the temperature of buildings 116 and/or building zones 62-68, as defined by the airside zone temperature models. Examples of these and other constraints which can be implemented by high level coordinator 112 are described in detail in U.S. patent application Ser. No. 15/426,962 filed Feb. 7, 2017, and U.S. patent application Ser. No. 15/473,496 filed Mar. 29, 2017. The entire disclosures of both these patent applications are incorporated by reference herein.

Low Level Airside Controller

Figure 8:
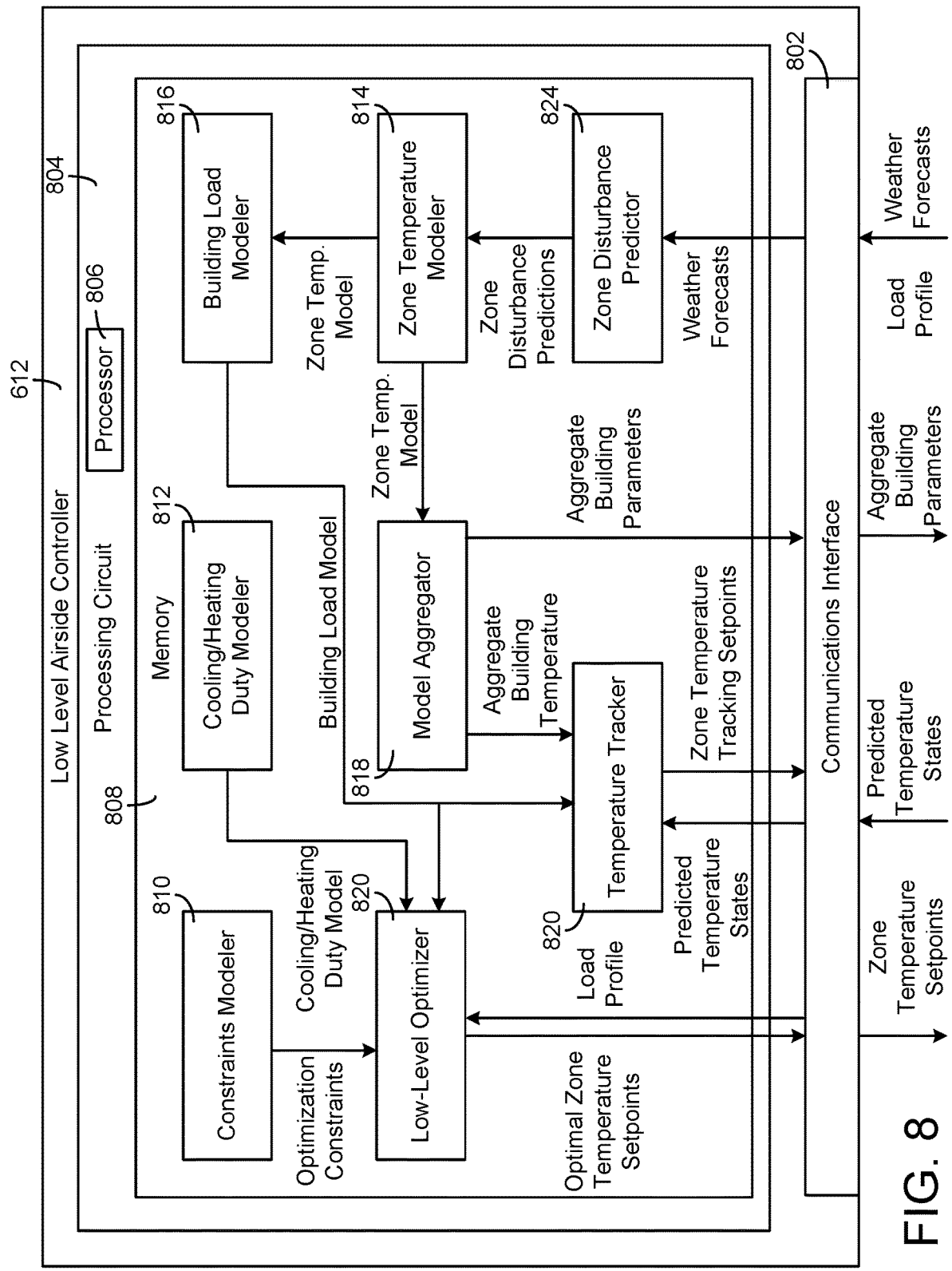
FIG. 8 is a block diagram illustrating one of the low level airside controllers of FIG. 6A in greater detail, according to an exemplary embodiment.

Referring now to FIG. 8, a block diagram illustrating low level airside controller 612 in greater detail is shown, according to some embodiments. Although only one low level airside controller 612 is shown in detail, it should be understood that any other low level airside controllers in control system 600 (e.g., low level airside controller 614) can include some or all of the same components as low level airside controller 612. Control system 600 can include any number of low level airside controllers, each of which can operate independently to monitor and control a separate low level airside subsystem (e.g., airside subsystems 632-634).

Low level airside controller 612 is shown a communications interface 802 and a processing circuit 804. Communications interface 802 can include wired or wireless interfaces (e.g., jacks, antennas, transmitters, receivers, transceivers, wire terminals, etc.) for conducting data communications with various systems, devices, or networks. For example, communications interface 802 can include an Ethernet card and port for sending and receiving data via an Ethernet-based communications network and/or a Wi-Fi transceiver for communicating via a wireless communications network. Communications interface 802 can be configured to communicate via local area networks or wide area networks (e.g., the Internet, a building WAN, etc.) and may use a variety of communications protocols (e.g., BACnet, IP, LON, etc.).

Communications interface 802 can be a network interface configured to facilitate electronic data communications between low level airside controller 612 and various external systems or devices (e.g., weather service 601, high level coordinator 112, airside equipment 622, etc.). For example, low level airside controller 612 can receive weather forecasts from weather service 601 and/or load predictions from load/rate predictor 622. Low level airside controller 612 can receive measurements from the BMS indicating one or more measured states of the controlled building or campus (e.g., temperature, humidity, electric loads, etc.) and one or more states of airside subsystem 632 (e.g., equipment status, power consumption, equipment availability, etc.). Low level airside controller 612 can receive predicted temperature states and/or a load profile from high level coordinator 112. Low level airside controller 612 can use the information received at communications interface 802 to generate zone temperature setpoints each zone of low level airside subsystem 632. Low level airside controller 612 can provide the zone temperature setpoints to airside equipment 622.

Processing circuit 804 is shown to include a processor 806 and memory 808. Processor 806 can be a general purpose or specific purpose processor, an application specific integrated circuit (ASIC), one or more field programmable gate arrays (FPGAs), a group of processing components, or other suitable processing components. Processor 806 can be configured to execute computer code or instructions stored in memory 808 or received from other computer readable media (e.g., CDROM, network storage, a remote server, etc.).

Memory 808 can include one or more devices (e.g., memory units, memory devices, storage devices, etc.) for storing data and/or computer code for completing and/or facilitating the various processes described in the present disclosure. Memory 808 can include random access memory (RAM), read-only memory (ROM), hard drive storage, temporary storage, non-volatile memory, flash memory, optical memory, or any other suitable memory for storing software objects and/or computer instructions. Memory 808 can include database components, object code components, script components, or any other type of information structure for supporting the various activities and information structures described in the present disclosure. Memory 808 can be communicably connected to processor 806 via processing circuit 804 and can include computer code for executing (e.g., by processor 806) one or more processes described herein. When processor 806 executes instructions stored in memory 808, processor 806 generally configures low level airside controller 612 (and more particularly processing circuit 804) to complete such activities.

Still referring to FIG. 8, low level airside controller 612 is shown to include a zone disturbance predictor 824. Zone disturbance predictor 824 can generate a disturbance forecast for each zone i of airside subsystem 632. Throughout this disclosure, the index i is used to denote individual zones, where i=1 ... $n_z$ and $n_z$ is the total number of zones in a given airside subsystem. The disturbance forecast for zone i can include a vector of disturbance values $\dot{Q}_{other,i}$, where each element of the vector $\dot{Q}_{other,i}$ includes a predicted disturbance value $\dot{Q}_{other,i,k}$ for a particular time step k of the optimization period.

Zone disturbance predictor 824 is shown receiving weather forecasts from a weather service 601. In some embodiments, zone disturbance predictor 824 generates the disturbance forecasts as a function of the weather forecasts. In some embodiments, zone disturbance predictor 824 uses feedback from regulatory layer 620 to generate the disturbance forecasts. Feedback from regulatory layer 620 can include various types of sensory inputs (e.g., temperature, flow, humidity, enthalpy, etc.) or other data relating to the controlled building or campus (e.g., building occupancy data, building electric load, etc.). In some embodiments, zone disturbance predictor 824 uses a deterministic plus stochastic model trained from historical load data to generate the disturbance forecasts. Zone disturbance predictor 824 can use any of a variety of prediction methods to generate the disturbance forecasts (e.g., linear regression for the deterministic portion and an autoregressive model for the stochastic portion).

Zone disturbance predictor 824 can predict one or more different types of disturbances for each building zone i. For example, zone disturbance predictor 824 can predict a thermal load resulting from heat transfer between the air within building zone i and outside air through the walls of the building. Zone disturbance predictor 824 can predict a thermal load resulting from internal heat generation within the building zone (e.g., heat generated by electronics in the building zone, heat generated by zone occupants, etc.). In some embodiments, zone disturbance predictor 824 makes disturbance predictions using the predictive techniques described in U.S. patent application Ser. No. 14/717,593.

Still referring to FIG. 8, low level airside controller 612 is shown to include a zone temperature modeler 814. Zone temperature modeler 814 can generate a temperature model for each building zone i of airside subsystem 632. Airside subsystem 632 can have any number of zones. In some embodiments, the temperature of each zone can be independently controlled and/or adjusted. Some building zones can exchange heat with each other (e.g., if the building zones are adjacent to one another), whereas other building zones do not directly exchange energy. In general, zone temperature modeler 814 can generate $n_z$ zone temperature models, where $n_z$ is the total number of zones in airside subsystem 632.

In some embodiments, zone temperature modeler 814 models the temperature of each building zone using a zone heat transfer model. The dynamics of heating or cooling a single building zone are described by the energy balance:

$$C\frac{dT}{dt} = -H(T - T_a) - \dot{Q}_c + \dot{Q}_{other}$$

where C is the thermal capacitance of the building zone, H is the ambient heat transfer coefficient for the building zone, T is the temperature of the building zone, $T_a$ is the ambient temperature outside the building zone (e.g., the outside air temperature), $\dot{Q}_c$ is the amount of cooling applied to the building zone (i.e., the cooling load), and $\dot{Q}_{other}$ is the external load, radiation, or other disturbance experienced by the building zone. In the previous equation, $\dot{Q}_c$ represents heat transfer out of the building zone (i.e., cooling) by the HVAC system and therefore has a negative sign. However, if heating is applied to the building zone rather than cooling, the sign on $\dot{Q}_c$ can be switched to a positive sign such that $\dot{Q}_c$ represents the amount of heating applied to the building zone by the HVAC system (i.e., the heating load).

The previous equation combines all mass and air properties of the building zone into a single zone temperature. Other heat transfer models which can be used by zone temperature modeler 814 include the following air and mass zone models:

$$C_z\frac{dT_z}{dt} = H_{az}(T_a - T_z) + H_{mz}(T_m - T_z) - \dot{Q}_c + \dot{Q}_{other}$$

$$C_m\frac{dT_m}{dt} = H_{mz}(T_z - T_m)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by zone temperature modeler 814 include the following air, shallow mass, and deep mass zone models:

$$C_z\frac{dT_z}{dt} = H_{az}(T_a - T_z) + H_{sz}(T_s - T_z) - \dot{Q}_c + \dot{Q}_{other}$$

$$C_s\frac{dT_s}{dt} = H_{sz}(T_z - T_s) + H_{ds}(T_d - T_s)$$

$$C_d\frac{dT_d}{dt} = H_{ds}(T_s - T_d)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, zone temperature modeler 814 models the temperature of each building using the following zone temperature model:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

where $C_i$ and $T_i$ are the thermal capacitance and temperature of the building zone designated by zone index i, $T_a$ is the ambient air temperature outside zone i (e.g., outside air temperature), $H_i$ is the heat transfer coefficient between zone i and the ambient air, $\dot{Q}_{c,i}$ is the amount of cooling applied to the building zone i by Control system 600 (i.e., the amount of heat removed from the zone), and $\dot{Q}_{other,i}$ is the external load, radiation, or disturbance experienced by zone i. If heating is provided to the zone rather than cooling, the sign on $\dot{Q}_{c,i}$ can be switched from a negative sign to a positive sign.

The parameter $\beta_{ij}$ characterizes the degree of coupling between zone i and another zone j (e.g., a building zone adjacent to zone i). If zones i and j are not adjacent and/or do not directly exchange heat with each other, zone temperature modeler 814 can set the value of $\beta_{ij}$ equal to zero. The zone temperature model can include a summation of the heat transfers between building zone i and each other building zone j≠i as a function of the zone temperatures $T_i$ and $T_j$ and the coupling coefficient $\beta_{ij}$. In other embodiments, heat transfer between zones can be accounted for using the external disturbance estimate $\dot{Q}_{other,i}$.

Zone temperature modeler 814 can use the zone disturbance estimates received from zone disturbance predictor 824 to identify appropriate values of the external disturbance $\dot{Q}_{other,i}$ for each zone i at each time step of the optimization period. In some embodiments, zone temperature modeler 824 uses the weather forecasts from weather service 601 and/or the load and rate predictions provided by load/rate predictor 622 to determine appropriate values for the ambient air temperature $T_a$ and/or the external disturbance $\dot{Q}_{other,i}$ for each zone i at each time step of the optimization period. Values of $C_i$ and $H_i$ can be specified as parameters of the zone i, received from the BMS that manages the building zone i, received from a user, retrieved from memory 808, or otherwise provided to zone temperature modeler 814. Zone temperature modeler 714 can generate a zone temperature model for each zone i, where i=1 ... $n_z$ and $n_z$ is the total number of zones.

Still referring to FIG. 8, low level airside controller 612 is shown to include a building load modeler 816. Building load modeler 816 can generate a model of the total amount of thermal energy delivered to the airside subsystem $Q_{total}$ (e.g., the total amount of heating or cooling delivered to the building) as a function of the individual zone loads $\dot{Q}_{c,i}$. In some embodiments, building load modeler 816 models the total building load using the following equation:

$$\frac{dQ_{total}}{dt} = \sum_{i=1}^{n_z} \dot{Q}_{c,i}$$

where $Q_{total}$ is the total amount of thermal energy (e.g., heating or cooling) delivered to the airside subsystem and $\dot{Q}_{c,i}$ is the rate at which thermal energy is being delivered (units of power) of a particular zone i. The building load model can sum the thermal energy loads $\dot{Q}_{c,i}$ of each building zone to calculate the total airside subsystem thermal energy load $$\frac{dQ_{total}}{dt},$$

which is the derivative of the total amount of thermal energy $Q_{total}$ delivered to the airside subsystem.

Low level airside controller 612 is shown to include a cooling/heating duty modeler 820. Cooling/heating duty modeler 820 can generate one or more models that define the thermal energy load $\dot{Q}_{c,i}$ of each building zone as a function of the zone temperature $T_i$ and the zone temperature setpoint $T_{sp,i}$ as shown in the following equation:

$$\dot{Q}_{c,i} = f(T_i, T_{sp,i})$$

The models generated by cooling/heating duty modeler 820 can be used as optimization constraints to ensure that the thermal energy load $\dot{Q}_{c,i}$ is not reduced to a value that would cause the zone temperature $T_i$ to deviate from an acceptable or comfortable temperature range.

In some embodiments, cooling/heating duty modeler 820 relates zone thermal energy load $\dot{Q}_{c,i}$ to the zone temperature $T_i$ and the zone temperature setpoint $T_{sp,i}$ using multiple models. For example, cooling/heating duty modeler 820 can use a model of the zone regulatory controller to determine the control action performed by the controller as a function of the zone temperature $T_i$ and the zone temperature setpoint $T_{sp,i}$. An example of such a zone regulatory controller model is shown in the following equation:

$$v_{air,i} = f_1(T_i, T_{sp,i})$$

where $v_{air,i}$ is the rate of airflow to building zone i (i.e., the control action). The function $f_1$ can be identified from data. For example, cooling/heating duty modeler 820 can collect measurements of $v_{air,i}$ and $T_i$ and identify the corresponding value of $T_{sp,i}$. Cooling/heating duty modeler 820 can perform a system identification process using the collected values of $v_{air,i}$, $T_i$ and $T_{sp,i}$ as training data to determine the function $f_1$ that defines the relationship between such variables.

Cooling/heating duty modeler 820 can use an energy balance model relating the control action $v_{air,i}$ to the zone thermal energy load $\dot{Q}_{c,i}$, as shown in the following equation:

$$\dot{Q}_{c,i} = f_2(v_{air,i})$$

where the function $f_2$ can be identified from training data. Cooling/heating duty modeler 820 can perform a system identification process using collected values of $v_{air,i}$ and $\dot{Q}_{c,i}$ to determine the function $f_2$ that defines the relationship between such variables.

In some embodiments, a linear relationship exists between $\dot{Q}_{c,i}$ and $v_{air,i}$. Assuming an ideal proportional-integral (PI) controller and a linear relationship between $\dot{Q}_{c,i}$ and $v_{air,i}$, a simplified linear controller model can be used to define the thermal energy load $\dot{Q}_{c,i}$ of each building zone as a function of the zone temperature $T_i$ and the zone temperature setpoint $T_{sp,i}$. An example of such a model is shown in the following equations:

$$\dot{Q}_{c,i} = \dot{Q}_{ss,i} + K_{c,i}\left[\varepsilon_i + \frac{1}{\tau_{I,i}}\int_0^t \varepsilon_i(t')dt'\right]$$

$$\varepsilon_i = T_{sp,i} - T_i$$

where $\dot{Q}_{ss,i}$ is the steady-state rate of heating or cooling rate, $K_{c,i}$ is the scaled zone PI controller proportional gain, $\tau_{I,i}$ is the zone PI controller integral time, and $\varepsilon_i$ is the setpoint error (i.e., the difference between the zone temperature setpoint $T_{i,sp}$ and the zone temperature $T_{sp}$). Saturation can be represented by constraints on $\dot{Q}_{c,i}$. If a linear model is not sufficiently accurate to model the PI controller and heat transfer in the AHU for zone i, a nonlinear heating/cooling duty model can be used instead.

Advantageously, modeling the regulatory controllers (e.g., zone PI controllers) in the low level airside optimization problem allows low level airside controller 612 to use the dynamics of the regulatory controllers when determining the optimal temperature setpoints. In some embodiments, the responses of the regulatory controllers can be sluggish. For example, it can take some zones up to an hour to reach a new temperature setpoint. Using the dynamics of the regulatory controllers in the low level controller problem allows low level airside controller 612 to consider the time between control action and effect such that optimal temperature setpoints can be selected in view of time-varying energy prices.

Still referring to FIG. 8, low level airside controller 612 is shown to include a constraints modeler 810. Constraints modeler 810 can generate and impose optimization constraints on the optimization procedure performed by low level optimizer 812. Constraints imposed by constraints modeler 810 can include, for example, equipment capacity constraints and zone temperature constraints. In some embodiments, constraints modeler 810 imposes constraints on the zone temperature $T_i$. For example, constraints modeler 810 can constrain the zone temperature $T_i$ between a minimum temperature $T_{min}$ and a maximum temperature $T_{max}$ as shown in the following equation:

$$T_{min} \leq T_i \leq T_{max}$$

where the values of $T_{min}$ and $T_{max}$ can be adjusted based on the temperature setpoints of the building.

In some embodiments, constraints modeler 810 automatically adjusts the values of $T_{min}$ and $T_{max}$ based on information received from the BMS for the building zone. For example, constraints modeler 810 can use a temperature setpoint schedule and/or occupancy schedule for the building zone to automatically adjust the values of $T_{min}$ and $T_{max}$ for each time step k. This allows constraints modeler 810 to use temperature limits based on the time-varying setpoint temperature range for the zone so that the zone temperature $T_i$ is maintained within time-appropriate temperature limits $T_{min}$ and $T_{max}$.

In some embodiments, constraints modeler 810 imposes a constraint to ensure that the total airside subsystem load during any time step k is no greater than the thermal energy load allocated to the airside subsystem by high level coordinator 112. For example, constraints modeler 810 can impose the constraint:

$$\frac{Q_{total,k+1} - Q_{total,k}}{\Delta} \leq \dot{Q}_{c,b,k}$$

where $Q_{total,k+1}$ is the total airside subsystem energy consumed at time step k+1, $Q_{total,k}$ is the total airside subsystem energy consumed at time step k, $\dot{Q}_{c,b,k}$ is the thermal energy load allocated to the airside subsystem b by high level coordinator 112, and $\Delta$ is the duration of each time step. The left side of the equation represents the airside subsystem thermal energy load during time step k (i.e., the change in total thermal energy delivered between consecutive time steps divided by the time step duration), whereas the right side of the equation represents the thermal energy load allocated to airside subsystem b during time step k by high level coordinator 112.

In some embodiments, constraints modeler 810 imposes an additional constraint to ensure that the total amount of thermal energy delivered does not decrease between consecutive time steps, as shown in the following equation:

$$Q_{total,k+1} - Q_{total,k} \geq 0$$

Since $Q_{total,k+1}$ is a summation of the amount of thermal energy delivered up to time step k+1, this constraint prevents low level optimizer 812 from selecting a negative value for the thermal energy load $\dot{Q}_{c,i}$ at time step k. In other words, the rate at which thermal energy is delivered (i.e., $\dot{Q}_{c,i}$) can add to the total amount of thermal energy delivered over the optimization period, but cannot subtract from the total amount of thermal energy delivered.

Low level optimizer 812 can use the zone temperature models, building load model, cooling/heating duty model, and optimization constraints to formulate an optimization problem. In some embodiments, the low level optimization problem seeks to minimize the total amount of thermal energy $Q_{total,N}$ used by the airside subsystem 632 over the optimization period subject to the zone temperature constraints and other constraints provided by the low level airside models described herein. For example, low level optimizer 812 can formulate the low level optimization problem as:

$$\min_{x,u} Q_{total,N}$$

subject to the following constraints:

$$C_i \frac{dT_i}{dt} = -H_i(T_i - T_a) - \sum_{j \neq i}\beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$\frac{Q_{total,k+1} - Q_{total,k}}{\Delta} \leq \dot{Q}_{c,b,k}$$

$$Q_{total,k+1} - Q_{total,k} \geq 0$$

$$\dot{Q}_{c,i} = f(T_i, T_{sp,i})$$

where the function $f$ is defined according to the following relationship between $\dot{Q}_{c,i}$, $T_i$, and $T_{i,sp}$ $$\dot{Q}_{c,i} = \dot{Q}_{ss,i} + K_{c,i}\left[\varepsilon_i + \frac{1}{\tau_{I,i}}\int_0^t \varepsilon_i(t')dt'\right]$$

$$\varepsilon_i = T_{sp,i} - T_i$$

In some embodiments, low level optimizer 812 converts one or more of the above-identified models and/or constraints to state-space form for use in the low level optimization problem. For example, low level optimizer 812 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. Table 2 illustrates the variables that can be included in each of these vectors:

TABLE 2

| Variables in Low level Optimization | | |
|---|---|---|
| States | $x = [T_i \; \bar{\varepsilon}_i \; Q_{total}]^T$ | $n = 2n_z + 1$ |
| Inputs | $u = [T_{sp,i}]^T$ | $m = n_z$ |
| Measurements | $y = [T_i \; Q_{total}]^T$ | $p = n_z + 1$ |
| Disturbances | $d = [T_a \; \dot{Q}_{other,i} \; \dot{Q}_{ss,i}]^T$ | $n_d = 2n_z + 1$ |

As shown in Table 2, the system states vector x includes the zone temperature $T_{ti}$, the integral of the zone tracking error $\bar{\varepsilon}_i$, and the total thermal energy delivered to the airside subsystem. In some embodiments, the system states vector x includes a zone temperature $T_i$ and an integrated zone tracking error $\bar{\varepsilon}_i$ for each of the $n_z$ zones and single total thermal energy value such that the total number n of variables in the system states vector x is equal to $2n_z + 1$. The inputs vector u can include the temperature setpoint $T_{sp,i}$. In some embodiments, the inputs vector u includes a temperature setpoint $T_{sp,i}$ for each of the $n_z$ zones such that the total number m of variables in the inputs vector u is equal to $n_z$.

In some embodiments, the measurements vector y is the same as the system states vector x, but without the integrated zone tracking error $\bar{\varepsilon}_i$. This indicates that the zone temperature $T_i$ and the total amount of thermal energy delivered $Q_{total}$ are directly measured. The value of the integrated zone tracking error $\bar{\varepsilon}_i$ can be calculated from the difference between $T_{i,sp}$ and $T_i$. The disturbance vector d can include the ambient air temperature $T_a$, the estimated disturbance $\dot{Q}_{other,i}$ for each zone, and the steady-state rate of heating/cooling $\dot{Q}_{ss,i}$ for each zone. In some embodiments, the disturbances vector d includes an estimated disturbance $\dot{Q}_{other,i}$ and a steady-state rate of heating/cooling $\dot{Q}_{ss,i}$ for each of the $n_z$ buildings and a single ambient air temperature $T_a$ such that the total number $n_d$ of variables in the disturbances vector d is equal to $n_z + 1$.

In some embodiments, the system states x can be constructed or predicted from the measurements y. For example, low level airside controller 612 can use a Kalman filter or other predictive technique to construct the system states x from the measurements y. The values of the A, B, C, and D matrices in the state-space representation can be identified using a system identification technique. Examples of state prediction and system identification techniques which can be used by low level controller 612 are described in detail in U.S. Pat. No. 9,235,657.

Still referring to FIG. 8, low level airside controller 612 is shown to include a model aggregator 818. Model aggregator 818 can generate aggregate values for various building parameters and/or variables used in the low level optimization. For example, model aggregator 818 can generate an aggregate building temperature $T_b$ for the low level airside subsystem by aggregating the individual zone temperatures $T_i$ of each zone in the building. In some embodiments, model aggregator 818 generates the aggregate building temperature $T_b$ using the following equation:

$$T_b = \frac{\sum_{i=1}^{n_z} C_i T_i}{\sum_{i=1}^{n_z} C_i}$$

where $C_i$ is the thermal capacitance of zone i and $T_i$ is the temperature of zone i. The numerator of the previous equation represents the total amount of heat in the building, whereas the denominator represents the total thermal capacitance of the building. Both quantities are summed across all building zones i=1 ... $n_z$. Model aggregator 818 can divide the total amount of heat by the total thermal capacitance to estimate an average building temperature $T_b$. Model aggregator 818 can calculate an aggregate building temperature $T_{b,k}$ for each time step k of the optimization period.

Model aggregator 818 can calculate aggregate values for other building parameters or variables such as the building thermal capacitance $C_b$, the building heat transfer coefficient $H_b$, and the estimated building disturbance $\dot{Q}_{other,b}$. In some embodiments, model aggregator 818 calculates the aggregate values for these variables and parameters using the following equations:

$$C_b = \sum_{i=1}^{n_z} C_i \quad H_b = \sum_{i=1}^{n_z} H_i \quad \dot{Q}_{other,b} = \sum_{i=1}^{n_z} \dot{Q}_{other,i}$$

where the building thermal capacitance $C_b$ is the summation of the zone thermal capacitance $C_i$ values for each building zone, the building heat transfer coefficient $H_b$ is the summation of the zone heat transfer coefficients $H_i$ values for each building zone, and the estimated building disturbance $\dot{Q}_{other,b}$ is the summation of the estimated building disturbances $\dot{Q}_{other,i}$ for each building zone. Model aggregator 818 can calculate aggregate values of $C_{b,k}$, $H_{b,k}$, and $\dot{Q}_{other,b,k}$ or each time step k of the optimization period.

In some embodiments, model aggregator 818 provides the aggregate building parameters and variables $T_b$, $C_b$, $H_b$, and $\dot{Q}_{other,b}$ to high level coordinator 112. High level coordinator 112 can use such values as inputs to the high level models, constraints, and optimization function used in the high level optimization. Advantageously, the model aggregation performed by model aggregator 818 helps to reduce the amount of information exchanged between each low level airside controller 612-614 and high level coordinator 112. For example, each low level controller 612-614 can provide high level coordinator 112 with the aggregate values described above rather than individual values of such variables and parameters for each building zone.

Still referring to FIG. 8, low level airside controller 612 is shown to include a temperature tracker 822. In some embodiments, temperature tracker 822 performs an alternative optimization which can supplement or replace the low level optimization performed by low level optimizer 812. Rather than minimizing the total thermal energy $Q_{total,N}$ used by the low level airside subsystem, temperature tracker 822 can generate zone temperature setpoints $T_{sp,i}$ which track the predicted building temperature states $\hat{T}_{b,k}$ generated by high level coordinator 112 as a result of the high level optimization. For example, high level coordinator 112 can calculate the building temperature states $\hat{T}_{b,k}$ for each low level airside subsystem 632-634 predicted to result from the load profiles generated by high level coordinator 112. As described above, the predicted temperature states $\hat{T}_{b,k}$ can be calculated using a Kalman filter or any other type of state prediction technique. High level coordinator 112 can provide the predicted temperature states $\hat{T}_{b,k}$ to each low level airside controller 612-614 for use in the temperature tracking process.

Temperature tracker 822 is shown receiving the predicted temperature states $\hat{T}_{b,k}$ via communications interface 802. Temperature tracker 822 can also receive the aggregate building temperatures $T_{b,k}$ generated by model aggregator 818. Temperature tracker 822 can formulate an objective function which seeks to minimize the error between the aggregate building temperatures $T_{b,k}$ and the predicted temperature states $\hat{T}_{b,k}$, as shown in the following equation:

$$\sum_{k=1}^{N} \frac{1}{2} \|T_{b,k} - \hat{T}_{b,k}\|^2 + \mu Q_{total,N}$$

where $\mu$ is a small penalty factor applied to the total amount of thermal energy $Q_{total,N}$ used by the airside subsystem over the optimization period. The value of $\mu$ can be adjusted to increase or decrease the weight assigned to the total amount of thermal energy $Q_{total,N}$ relative to the temperature tracking error.

Temperature tracker 822 can use the previous equation as the objective function in an optimization procedure to determine optimal values for the zone temperature setpoints $T_{sp,i}$. The optimization performed by temperature tracker 822 can be similar to the optimization performed by low level optimizer 812, with the exception that temperature tracker 822 is not constrained by the load profile provided by high level coordinator 112 and seeks to optimize a different objective function. For example, temperature tracker 822 can minimize the objective function:

$$\min_{x,u} \sum_{k=1}^{N} \frac{1}{2} \|T_{b,k} - \hat{T}_{b,k}\|^2 + \mu Q_{total,N}$$

subject to the following constraints:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$Q_{total,k+1} - Q_{total,k} \geq 0$$

$$\dot{Q}_{c,i} = f(T_i, T_{sp,i})$$

where the function $f$ is defined according to the following relationship between $\dot{Q}_{c,i}$, $T_i$, and $T_{i,sp}$ $$\dot{Q}_{c,i} = \dot{Q}_{ss,i} + K_{c,i}\left[\varepsilon_i + \frac{1}{\tau_{I,i}} \int_0^t \varepsilon_i(t') dt'\right]$$

$$\varepsilon_i = T_{sp,i} - T_i$$

In some embodiments, temperature tracker 822 converts one or more of the above-identified models and/or constraints to state-space form for use in the low level optimization problem. For example, temperature tracker 822 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. The variables included in each vector can be the same as shown in Table 2 above.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for a central energy facility with distributed energy storage, the control system comprising:
    a high level coordinator configured to perform a high level optimization to generate an airside load profile comprising an airside load for an airside system, a subplant load profile comprising a subplant load for each subplant of a central plant, and a battery power profile comprising a power setpoint for a battery at each of a plurality of time steps in an optimization period, the high level optimization comprising one or more constraints, the high level coordinator configured to coordinate the airside load profile, the subplant load profile, and the battery power profile and coordinate utilization of the battery by the airside system and the central plant;
    a low level airside controller configured to use the airside load profile to operate airside HVAC equipment of the airside system;
    a central plant controller configured to use the subplant load profile to operate central plant equipment of the central plant; and
    a battery controller configured to use the battery power profile to control an amount of electric energy stored in the battery or discharged from the battery at each of the plurality of time steps.

2. The control system of claim 1, wherein the high level coordinator is configured to perform the high level optimization by optimizing an objective function which accounts for:
    a total cost of energy consumed by the airside HVAC equipment and the central plant equipment; and
    revenue generated by operating the battery to participate in an incentive-based demand response program.

3. The control system of claim 1, wherein the high level coordinator is configured to:
    detect whether the airside HVAC equipment, the central plant equipment, and the battery are present;
    in response to a first determination that the central plant equipment are not present, automatically adjust the high level optimization to omit generating the subplant load profile;
    in response to a second determination that the airside HVAC equipment are not present, automatically adjust the high level optimization to omit generating the airside load profile; and
    in response to a third determination that the battery is not present, automatically adjust the high level optimization to omit generating the battery power profile.

4. A heating, ventilation, or air conditioning (HVAC) system for a building, the HVAC system comprising:
    an airside system comprising airside HVAC equipment configured to provide heating or cooling to a building zone;
    a central plant comprising central plant equipment configured to produce thermal energy used by the airside system to provide the heating or cooling;
    a battery configured to store electrical energy and discharge the electrical energy for use in powering at least one of the building, the airside HVAC equipment, or the central plant equipment; and
    a high level coordinator configured to perform a high level optimization to generate an airside load profile comprising an airside load for the airside system, a subplant load profile comprising a subplant load for each subplant of the central plant, and a battery power profile comprising a power setpoint for the battery at each of a plurality of time steps in an optimization period, wherein the high level coordinator is configured to adjust utilization of the battery by both the airside system and the central plant.

5. The HVAC system of claim 4, wherein the high level coordinator is configured to:
    automatically adjust the high level optimization to omit generating the subplant load profile in response to a first determination that the central plant is not detected;
    automatically adjust the high level optimization to omit generating the airside load profile in response to a second determination that the airside system is not detected; and
    automatically adjust the high level optimization to omit generating the battery power profile in response to a third determination that the battery is not detected.

6. The HVAC system of claim 4, further comprising a low level airside controller configured to use the airside load profile to operate the airside HVAC equipment of the airside system.

7. The HVAC system of claim 4, wherein the airside system comprises a plurality of airside subsystems, each airside subsystem comprising a portion of the airside HVAC equipment configured to provide heating or cooling to a corresponding building zone;
    wherein the high level coordinator is configured to generate an airside subsystem load profile for each of the plurality of airside subsystems.

8. The HVAC system of claim 7, further comprising a plurality of low level airside controllers, each corresponding to one of the airside subsystems and configured to use the airside subsystem load profile for the corresponding airside subsystem to operate the portion of the airside HVAC equipment of the corresponding airside subsystem or generate setpoints that are used to operate the portion of the airside HVAC equipment of the corresponding airside subsystem.

9. The HVAC system of claim 4, wherein:
    the airside load profile indicates a thermal energy allocation to the airside system at each of the plurality of time steps; and
    the high level coordinator is configured to use an airside power consumption model to define an airside power consumption of the airside system as a function of the thermal energy allocation to the airside system.

10. The HVAC system of claim 4, wherein the high level coordinator is configured to generate an airside temperature model for the airside system, the airside temperature model defining a relationship between the airside load profile and a temperature of the building zone.

11. The HVAC system of claim 4, further comprising a central plant controller configured to:
    perform a low level optimization to generate setpoints for the central plant equipment subject to a constraint based on the subplant load profile; and
    use the setpoints for the central plant equipment to operate the central plant equipment.

12. The HVAC system of claim 4, wherein the high level coordinator is configured to perform the high level optimization by optimizing an objective function which accounts for at least one of a total cost of energy consumed by the airside HVAC equipment and the central plant equipment or revenue generated by operating the battery to participate in an incentive-based demand response program.

13. A method for operating a heating, ventilation, or air conditioning (HVAC) system for a building, the method comprising:
    operating an airside system comprising airside HVAC equipment to provide heating or cooling to a building zone;
    operating a central plant comprising central plant equipment to produce thermal energy used by the airside system to provide the heating or cooling;
    performing, subject to one or more constraints, a high level optimization to generate an airside load profile comprising an airside load for the airside system, a subplant load profile comprising a subplant load for each subplant of the central plant at each of a plurality of time steps in an optimization period, wherein performing the high level optimization comprises coordinating utilization of a battery by the airside system and the central plant.

14. The method of claim 13, further comprising:
    operating the battery to store electrical energy and discharge the electrical energy for use in powering at least one of the building, the airside HVAC equipment, or the central plant equipment;
    wherein performing the high level optimization comprises generating a battery power profile comprising a power setpoint for the battery at each of the plurality of time steps in the optimization period.

15. The method of claim 14, further comprising:
    automatically adjust the high level optimization to omit generating the subplant load profile in response to a first determination that the central plant is not detected;
    automatically adjust the high level optimization to omit generating the airside load profile in response to a second determination that the airside system is not detected; and
    automatically adjust the high level optimization to omit generating the battery power profile in response to a third determination that the battery is not detected.

16. The method of claim 13, further comprising using the airside load profile to operate the airside HVAC equipment of the airside system.

17. The method of claim 13, wherein the airside system comprises a plurality of airside subsystems, each airside subsystem comprising a portion of the airside HVAC equipment configured to provide heating or cooling to a different building zone;
    the method further comprising generating an airside subsystem load profile for each of the plurality of airside subsystems.

18. The method of claim 17, further comprising operating a plurality of low level airside controllers, each corresponding to one of the airside subsystems, to operate the portion of the airside HVAC equipment of the corresponding airside subsystem, wherein each of the low level airside controllers uses the airside subsystem load profile for the corresponding airside subsystem.

19. The method of claim 13, wherein the airside load profile indicates a thermal energy allocation to the airside system at each of the plurality of time steps;
    the method further comprising using an airside power consumption model to define an airside power consumption of the airside system as a function of the thermal energy allocation to the airside system.

20. The method of claim 13, further comprising generating an airside temperature model for the airside system, the airside temperature model defining a relationship between the airside load profile and a temperature of the building zone.

21. The method of claim 13, further comprising:
    performing a low level optimization to generate setpoints for the central plant equipment subject to a constraint based on the subplant load profile; and
    using the setpoints for the central plant equipment to operate the central plant equipment.

22. The method of claim 13, wherein performing the high level optimization comprises optimizing an objective function which accounts for at least one of a total cost of energy consumed by the airside HVAC equipment and the central plant equipment or revenue generated by operating the battery to participate in an incentive-based demand response program.

* * * * *